United States Patent
Nagpal et al.

(10) Patent No.: US 10,691,491 B2
(45) Date of Patent: Jun. 23, 2020

(54) ADAPTING A PRE-TRAINED DISTRIBUTED RESOURCE PREDICTIVE MODEL TO A TARGET DISTRIBUTED COMPUTING ENVIRONMENT

(71) Applicant: Nutanix, Inc., San Jose, CA (US)

(72) Inventors: Abhinay Nagpal, San Jose, CA (US); Aditya Ramesh, San Jose, CA (US); Himanshu Shukla, San Jose, CA (US); Rahul Singh, Mountain View, CA (US)

(73) Assignee: Nutanix, Inc., San Jose, CA (US)

( * ) Notice: Subject to any disclaimer, the term of this patent is extended or adjusted under 35 U.S.C. 154(b) by 0 days.

(21) Appl. No.: 15/298,149

(22) Filed: Oct. 19, 2016

(65) Prior Publication Data

US 2020/0034197 A1   Jan. 30, 2020

(51) Int. Cl.
*G06F 9/50* (2006.01)
*G06N 20/00* (2019.01)

(52) U.S. Cl.
CPC .............. *G06F 9/50* (2013.01); *G06N 20/00* (2019.01)

(58) Field of Classification Search
CPC ........................................................ G06F 9/50
See application file for complete search history.

(56) References Cited

U.S. PATENT DOCUMENTS

| | | | |
|---|---|---|---|
| 7,953,843 | B2 | 5/2011 | Cherkasova |
| 8,060,599 | B2 | 11/2011 | Cherkasova et al. |
| 8,104,041 | B2 | 1/2012 | Belady et al. |
| 8,291,411 | B2 | 10/2012 | Beaty et al. |
| 8,326,970 | B2 | 12/2012 | Cherkasova et al. |
| 8,464,254 | B1 | 6/2013 | Vohra et al. |
| 8,533,222 | B2 | 9/2013 | Breckenridge et al. |
| 8,549,518 | B1 | 10/2013 | Aron et al. |
| 8,560,671 | B1 | 10/2013 | Yahalom et al. |

(Continued)

OTHER PUBLICATIONS

Nagpal et al., "STAY-FIT: Seasonal Time series Analysis and Forecasting using Tournament Selection", 3 pages; Nutanix, Inc., San Jose, CA. USA.

(Continued)

*Primary Examiner* — Charlie Sun
(74) *Attorney, Agent, or Firm* — Vista IP Law Group, LLP

(57) ABSTRACT

Systems for distributed resource system management. A first computing system operates in a first computing environment. A predictive model is trained in the first computing environment to form a trained resource performance predictive model that comprises a set of trained model parameters to capture at least computing and storage IO parameters that are responsive to execution of one or more workloads that consume computing and storage resources in the first computing environment. When the trained resource performance predictive model is deployed to a second computing environment, various computing system configuration differences, and/or workload differences and/or other differences between the first computing environment and the second computing environment are detected and measured. Responsive to the detected differences and/or measurements, some of the trained resource performance predictive model parameters are modified to adapt the trained resource performance predictive model to any of the detected and/or measured characteristics of the second computing environment.

20 Claims, 11 Drawing Sheets

(56) References Cited

U.S. PATENT DOCUMENTS

| | | | |
|---|---|---|---|
| 8,601,473 B1* | 12/2013 | Aron | G06F 9/45533 709/223 |
| 8,626,902 B2 | 1/2014 | Singh et al. | |
| 8,850,130 B1 | 9/2014 | Aron et al. | |
| 8,863,124 B1 | 10/2014 | Aron | |
| 8,997,097 B1 | 3/2015 | Aron et al. | |
| 9,015,122 B2 | 4/2015 | Harrison et al. | |
| 9,032,077 B1 | 5/2015 | Klein et al. | |
| 9,047,083 B2 | 6/2015 | Gupta et al. | |
| 9,052,936 B1 | 6/2015 | Aron et al. | |
| 9,083,581 B1 | 7/2015 | Addepalli et al. | |
| 9,152,643 B2 | 10/2015 | Whitehead et al. | |
| 9,154,589 B1 | 10/2015 | Klein et al. | |
| 9,210,100 B2 | 12/2015 | Van Der et al. | |
| 9,256,374 B1 | 2/2016 | Aron et al. | |
| 9,256,475 B1 | 2/2016 | Aron et al. | |
| 9,317,223 B2 | 4/2016 | Reohr et al. | |
| 9,336,031 B2 | 5/2016 | Hackett et al. | |
| 9,354,912 B1 | 5/2016 | Aron et al. | |
| 9,389,887 B1 | 7/2016 | Aron et al. | |
| 9,405,569 B2 | 8/2016 | Greden et al. | |
| 9,417,903 B2 | 8/2016 | Bello et al. | |
| 9,552,259 B1 | 1/2017 | Chopra et al. | |
| 9,563,697 B1 | 2/2017 | Caplan | |
| 9,575,784 B1 | 2/2017 | Aron et al. | |
| 9,595,054 B2 | 3/2017 | Jain et al. | |
| 9,619,257 B1 | 4/2017 | Aron et al. | |
| 9,619,261 B2 | 4/2017 | Gaurav et al. | |
| 9,626,275 B1 | 4/2017 | Hitchcock et al. | |
| 9,639,426 B2 | 5/2017 | Pawar et al. | |
| 9,641,385 B1 | 5/2017 | Daniel et al. | |
| 9,665,386 B2 | 5/2017 | Bayapuneni et al. | |
| 9,705,817 B2 | 7/2017 | Lui et al. | |
| 9,772,866 B1 | 9/2017 | Aron et al. | |
| 9,817,719 B2 | 11/2017 | Dain et al. | |
| 9,836,229 B2 | 12/2017 | D'sa et al. | |
| 9,842,153 B2 | 12/2017 | Bishop | |
| 9,882,969 B2 | 1/2018 | Reddy et al. | |
| 9,886,215 B1 | 2/2018 | Ramachandran et al. | |
| 9,933,979 B2 | 4/2018 | Gu et al. | |
| 9,959,188 B1 | 5/2018 | Krishnan | |
| 9,961,017 B2 | 5/2018 | Jacob et al. | |
| 10,067,722 B2 | 9/2018 | Lakshman | |
| 10,127,234 B1 | 11/2018 | Krishnan et al. | |
| 10,296,494 B2 | 5/2019 | Davis et al. | |
| 2004/0205206 A1 | 10/2004 | Naik et al. | |
| 2006/0010101 A1 | 1/2006 | Suzuki et al. | |
| 2006/0053262 A1 | 3/2006 | Prahlad et al. | |
| 2006/0218551 A1 | 9/2006 | Berstis et al. | |
| 2006/0224823 A1 | 10/2006 | Morley et al. | |
| 2007/0136402 A1 | 6/2007 | Grose et al. | |
| 2008/0005468 A1 | 1/2008 | Faibish et al. | |
| 2008/0147934 A1 | 6/2008 | Nonaka et al. | |
| 2008/0295096 A1 | 11/2008 | Beaty et al. | |
| 2008/0320482 A1 | 12/2008 | Dawson et al. | |
| 2009/0030864 A1 | 1/2009 | Pednault et al. | |
| 2009/0287747 A1 | 11/2009 | Zane et al. | |
| 2009/0288084 A1 | 11/2009 | Astete et al. | |
| 2009/0319582 A1 | 12/2009 | Simek et al. | |
| 2010/0083248 A1 | 4/2010 | Wood et al. | |
| 2010/0217651 A1 | 8/2010 | Crabtree et al. | |
| 2010/0275058 A1 | 10/2010 | Hashimoto et al. | |
| 2011/0185355 A1 | 7/2011 | Chawla et al. | |
| 2011/0202657 A1 | 8/2011 | Chang et al. | |
| 2012/0041914 A1 | 2/2012 | Tirunagari | |
| 2012/0109619 A1 | 5/2012 | Gmach et al. | |
| 2012/0278275 A1 | 11/2012 | Danciu et al. | |
| 2013/0054910 A1 | 2/2013 | Vaghani et al. | |
| 2013/0086341 A1 | 4/2013 | Vasavi et al. | |
| 2013/0139152 A1 | 5/2013 | Chang et al. | |
| 2013/0174152 A1 | 7/2013 | Yu | |
| 2013/0185718 A1 | 7/2013 | Shiva et al. | |
| 2014/0082614 A1 | 3/2014 | Klein et al. | |
| 2014/0157260 A1* | 6/2014 | Balani et al. | G06F 9/45533 718/1 |
| 2014/0279784 A1 | 9/2014 | Casalaina et al. | |
| 2014/0282525 A1 | 9/2014 | Sapuram et al. | |
| 2014/0289268 A1 | 9/2014 | Patil et al. | |
| 2014/0344453 A1 | 11/2014 | Varney et al. | |
| 2015/0033224 A1 | 1/2015 | Maheshwari et al. | |
| 2015/0106578 A1 | 4/2015 | Warfield et al. | |
| 2015/0169291 A1 | 6/2015 | Dube et al. | |
| 2015/0234869 A1 | 8/2015 | Chan et al. | |
| 2015/0339572 A1 | 11/2015 | Achin et al. | |
| 2015/0341223 A1 | 11/2015 | Shen et al. | |
| 2015/0350102 A1 | 12/2015 | Leon-Garcia et al. | |
| 2015/0379429 A1 | 12/2015 | Lee et al. | |
| 2016/0019094 A1 | 1/2016 | Habdank et al. | |
| 2016/0048337 A1 | 2/2016 | Prahlad et al. | |
| 2016/0048408 A1 | 2/2016 | Madhu et al. | |
| 2016/0203176 A1 | 7/2016 | Mills | |
| 2016/0224384 A1 | 8/2016 | Gokhale et al. | |
| 2016/0232450 A1 | 8/2016 | Chen et al. | |
| 2016/0300142 A1 | 10/2016 | Feller et al. | |
| 2016/0359955 A1 | 12/2016 | Gill et al. | |
| 2016/0364647 A1 | 12/2016 | Achin et al. | |
| 2016/0373377 A1 | 12/2016 | Cao et al. | |
| 2016/0379125 A1 | 12/2016 | Bordawekar et al. | |
| 2017/0031816 A1 | 2/2017 | Lee et al. | |
| 2017/0262520 A1 | 9/2017 | Mitkar et al. | |
| 2017/0364307 A1 | 12/2017 | Lomelino et al. | |
| 2017/0364387 A1 | 12/2017 | Ahmed et al. | |
| 2018/0046487 A1 | 2/2018 | Matters et al. | |
| 2018/0060134 A1 | 3/2018 | Bianchini et al. | |
| 2018/0225139 A1 | 8/2018 | Hahn et al. | |
| 2019/0146707 A1 | 5/2019 | Fetik | |

OTHER PUBLICATIONS

Dlessner, "STAY-FIT: Getting Ready for What Is Next in Prism", Nutanix, Inc., Dec. 8, 2015, 4 pages.

[Nutanix-049] U.S. Appl. No. 15/006,435, filed Jan. 26, 2016, 65 pages.

[Nutanix-053] U.S. Appl. No. 15/173,577, filed Jun. 3, 2016, 102 pages.

[Nutanix-081] U.S. Appl. No. 15/191,387, filed Jun. 23, 2016, 59 pages.

Non-Final Office Action dated Mar. 22, 2018 for related U.S. Appl. No. 15/191,387.

Wikipedia. "Feasible region". Nov. 16, 2015. 2 pages.

"What Is Multiobjective Optimization?" Feb. 16, 2015. 1 page. http://www.mathworks.com/help/gads/what-is-multiobjective-optimization.html.

Caramia et al. "Multi-objective Optimization". 2008. 27 pages. Chapter 2. Springer-Verlag London.

Wikipedia. "Gittins index". Dec. 7, 2015. 6 pages.

Pandelis et al. "On the optimality of the Gittins index rule for multi-armed bandits with multiple plays". Jul. 1999. 13 pages.

Deel et al. "Linear Tape File System (LTFS) Format Specification". Dec. 21, 2013. 69 pages.

Non-Final Office Action dated Nov. 14, 2017 for related U.S. Appl. No. 15/186,235.

Non-Final Office Action dated Nov. 27, 2017 for related U.S. Appl. No. 15/160,246.

Final Office Action dated Mar. 30, 2018 for related U.S. Appl. No. 15/160,246.

Notice of Allowance dated May 16, 2018 for related U.S. Appl. No. 15/186,235.

Non-Final Office Action dated May 24, 2018 for related U.S. Appl. No. 15/351,388.

Non-Final Office Action dated Jun. 29, 2018 for related U.S. Appl. No. 15/352,495.

Mei et al., Performance Analysis of Network I/O Workload in Virtualized Data Centers, 2010, IEEE, pp. 1-16 (Year: 2010).

Paul et al., Performance Monitoring and Capacity Planning, 2006, VMWorld, pp. 1-39 Centers (Year: 2006).

Notice of Allowance dated Aug. 15, 2018 for related U.S. Appl. No. 15/160,246.

Final Office Action dated Aug. 15, 2018 for related U.S. Appl. No. 15/191,387.

(56) References Cited

OTHER PUBLICATIONS

U.S. Appl. No. 15/298,107, filed Oct. 19, 2016, 57 pages.
U.S. Appl. No. 15/341,549, filed Nov. 2, 2016, 90 pages.
U.S. Appl. No. 15/006,416, filed Jan. 26, 2016, 64 pages.
Non-Final Office Action dated Sep. 6, 2018 for related U.S. Appl. No. 15/283,004, 5 pages.
Advisory Action dated Nov. 1, 2018 for related U.S. Appl. No. 15/191,387, 3 pages.
Final Office Action dated Nov. 16, 2018 for related U.S. Appl. No. 15/351,388, 19 pages.
Notice of Allowance dated Dec. 31, 2018 for related U.S. Appl. No. 15/191,387, 8 pages.
Poitras, Steven. "The Nutanix Bible" (Oct. 15, 2013), from https://nutanixbible.com/the-nutanix-bible/ (Publication date based on indicated captdre date by Archive.org; first publication date unknown).
Poitras, Steven. "The Nutanix Bible" (Jan. 11, 2014), from https://nutanixbible.com/the-nutanix-bible/ (Publication date based on indicated captdre date by Archive.org; first publication date unknown).
Poitras, Steven. "The Nutanix Bible" (Jun. 20, 2014), from https://nutanixbible.com/the-nutanix-bible/ (Publication date based on indicated captdre date by Archive.org; first publication date unknown).
Poitras, Steven. "The Nutanix Bible" (Jan. 7, 2015), from https://nutanixbible.com/the-nutanix-bible/ (Publication date based on indicated captdre date by Archive.org; first publication date unknown).
Poitras, Steven. "The Nutanix Bible" (Jun. 9, 2015), from https://nutanixbible.com/the-nutanix-bible/ (Publication date based on indicated captdre date by Archive.org; first publication date unknown).
Poitras, Steven. "The Nutanix Bible" (Sep. 4, 2015), from https://nutanixbible.com/.
Poitras, Steven. "The Nutanix Bible" (Jan. 12, 2016), from https://nutanixbible.com/.
Poitras, Steven. "The Nutanix Bible" (Jun. 9, 2016), from https://nutanixbible.com/.
Poitras, Steven. "The Nutanix Bible" (Jan. 3, 2017), from https://nutanixbible.com/.
Poitras, Steven. "The Nutanix Bible" (Jun. 8, 2017), from https://nutanixbible.com/.
Poitras, Steven. "The Nutanix Bible" (Jan. 3, 2018), from https://nutanixbible.com/.
Poitras, Steven. "The Nutanix Bible" (Jun. 25, 2018), from https://nutanixbible.com/.
Poitras, Steven. "The Nutanix Bible" (Jan. 8, 2019), from https://nutanixbible.com/.
Final Office Action dated Feb. 15, 2019 for related U.S. Appl. No. 15/352,495, 22 pages.
Notice of Allowance dated Feb. 21, 2019 for related U.S. Appl. No. 15/283,004, 5 pages.
Notice of Allowance dated May 22, 2019 for U.S. Appl. No. 15/191,387.
Non-Final Office Action dated May 24, 2019 for related U.S. Appl. No. 15/251,244.
Notice of Allowance dated Jun. 5, 2019 for related U.S. Appl. No. 15/283,004.
Non-Final Office Action dated Jun. 6, 2019 for related U.S. Appl. No. 15/181,094.
Non-Final Office Action dated Jul. 5, 2019 for related U.S. Appl. No. 15/394,654.
Notice of Allowance dated Aug. 7, 2019 for related U.S. Appl. No. 15/283,004.
Final Office Action dated Jan. 7, 2020 for related U.S. Appl. No. 15/251,244.
Final Office Action dated Jan. 27, 2019 for related U.S. Appl. No. 15/181,094.

\* cited by examiner

ADAPTING A PRE-TRAINED DISTRIBUTED RESOURCE PREDICTIVE MODEL TO A TARGET DISTRIBUTED COMPUTING ENVIRONMENT

BACKGROUND

The resource usage efficiencies offered by distributed computing and storage systems has resulted in continually increasing deployment of such systems. Specifically, for example, certain components of a distributed computing system can coordinate between themselves to efficiently use a set of computing resources and/or data storage resources or facilities. A hyperconverged distributed system coordinates efficient use of compute resources, storage resources, networking resources, and/or other resources that are consumed by and between the components of the distributed system. Users or consumers of the resources in hyperconverged distributed systems are often embodied as virtualized entities (VEs). The VEs in hyperconverged distributed systems might be virtual machines (VMs) and/or containers, in full or hypervisor-assisted virtualization environments and/or operating system virtualization environments, respectively. Any of the foregoing VEs can be implemented in hyperconverged distributed systems to facilitate execution of one or more workloads. For example, a VM might be created to operate as an SQL server, while another VM might be created to support a virtual desktop infrastructure (VDI).

The configuration of the components comprising a hyperconverged distributed system and/or the workloads running on such systems can be highly dynamic. Configurations can vary among users of the systems, or within a particular system over time. For example, the node appliances underlying the virtualized entities can vary in number, CPU capacity (e.g., 16 cores, 24 cores, etc.), memory capacity (e.g., 128 GB, 256 GB, etc.), storage capacity (e.g., 480 GB SSD, 1 TB HDD, etc.), or network connectivity. Further, the combination and/or schedule of workloads running on the VEs can vary over time. Predictive models are often implemented to predict the performance of the VEs and/or workloads to facilitate efficient scheduling of resources across the hyperconverged distributed system. Such a resource performance predictive model might predict an aggregate of storage input and output (IO or I/O) performance characteristics (e.g., storage IO latency metrics, storage command response latency metrics, other storage IO parameters, etc.) corresponding to various workload scheduling scenarios to facilitate selecting an appropriate resource or workload allocation scenario (e.g., a scenario with the lowest storage IO latency) for deployment in the system.

Unfortunately, legacy techniques for implementing resource performance predictive models in hyperconverged distributed systems present limitations at least as pertaining to the severity and frequency of prediction errors during an initial learning phase of the models. For example, some legacy techniques deploy untrained resource performance predictive models when installing a target system. With such techniques, the model will initially exhibit large errors in its predictions. The initial training period might be long, especially if the model was trained in a computing environment that is different from the target system environment, and/or if the model was trained using stimulus and response that is different from the stimulus and response as seen in the environment of the target system.

What is needed is a technique or techniques to improve over legacy techniques and/or over other considered approaches. Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for using pre-trained resource performance predictive models in a dynamic hyperconverged computing environment, which techniques advance the relevant technologies to address technological issues with legacy approaches. More specifically, the present disclosure provides a detailed description of techniques used in systems, methods, and in computer program products for adapting pre-trained resource performance predictive models to a dynamic hyperconverged computing environment. Certain embodiments are directed to technological solutions for dynamically adapting a pre-trained resource performance predictive model upon deployment of the model in a target hyperconverged distributed computing environment.

The disclosed embodiments modify and improve over legacy approaches. In particular, the herein-disclosed techniques provide technical solutions that address the technical problems attendant to prediction errors during initial learning phases of resource performance predictive models in dynamic hyperconverged distributed systems. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of hyperconverged computing platform management as well as advances in various technical fields related to distributed storage systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
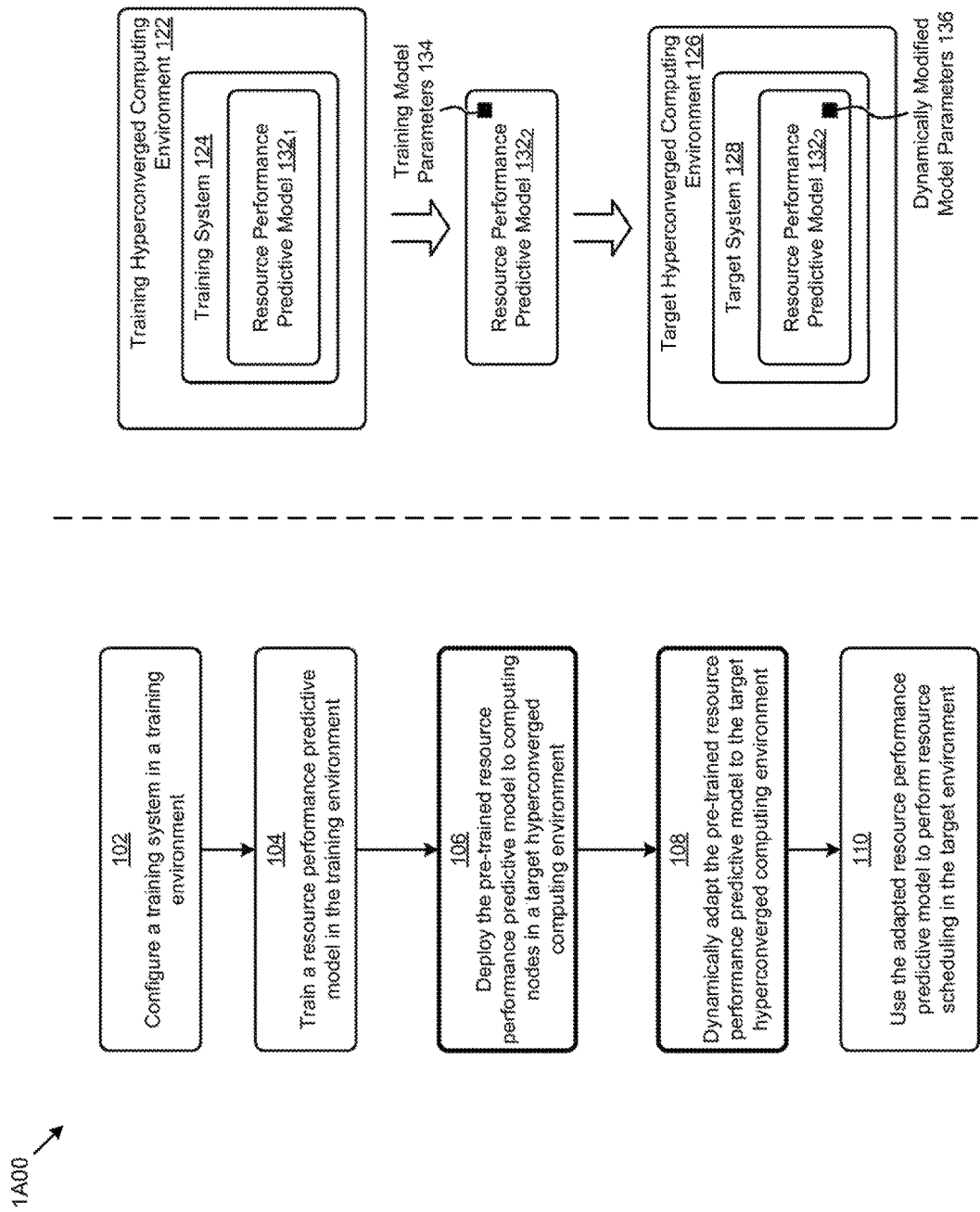
FIG. 1A presents a predictive model adaptation technique as implemented in systems that adapt a pre-trained predictive model to a target hyperconverged computing environment, according to an embodiment.

Embodiments in accordance with the present disclosure address problems pertaining to the severity and frequency of prediction errors during initial learning phases of resource performance predictive models in dynamic hyperconverged distributed systems. Some embodiments are directed to approaches for dynamically adapting a pre-trained resource performance predictive model upon deployment of the model in a target hyperconverged distributed computing environment. The accompanying figures and discussions herein present example environments, systems, methods, and computer program products for adapting pre-trained resource performance predictive models to a dynamic hyperconverged computing environment.

Overview

Disclosed herein are techniques for dynamically adapting a pre-trained resource performance predictive model upon deployment of the model in a target hyperconverged computing environment. In certain embodiments, a resource performance predictive model is trained in a training environment over various workload schedule scenarios prior to deployment of the model to a target environment. The pre-training results in a set of training model parameters that characterize various relationships between the training system configuration and/or the training workload schedule with respect to measured performance metrics. Responsive to deploying the pre-trained resource performance predictive model to a target hyperconverged computing environment, the model is dynamically adapted to the target system configuration and/or target workload schedule so as to reduce the occurrence and severity of prediction errors during the training period of the deployed model. In one or more embodiments, the training model parameters determined during the training phase are modified based on the target system configuration and/or the target workload schedule to facilitate adapting the model to the target environment. In some embodiments, the training model parameters characterize correlations between the stimuli and responses of the resource performance predictive model in the training environment. In certain embodiments, the combinations of workloads and/or the combinations of components in the training environment are selected so as to facilitate dynamic adaptation to a large variety of target environments. In certain embodiments, the pre-trained model is adapted to reflect observations made in the target environment prior to commencing a learning phase of the model in the target environment.

DEFINITIONS AND USE OF FIGURES

Some of the terms used in this description are defined below for easy reference. The presented terms and their respective definitions are not rigidly restricted to these definitions-a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments-they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

DESCRIPTIONS OF EXAMPLE EMBODIMENTS

FIG. 1A presents a predictive model adaptation technique 1A00 as implemented in systems that adapt a pre-trained predictive model to a target hyperconverged computing environment. As an option, one or more variations of predictive model adaptation technique 1A00 or any aspect thereof may be implemented in the context of the architecture and functionality of the embodiments described herein. The predictive model adaptation technique 1A00 or any aspect thereof may be implemented in any environment.

The predictive model adaptation technique 1A00 shown in FIG. 1A presents one embodiment of certain steps facilitated by the herein disclosed techniques for adapting a pre-trained predictive model to a target hyperconverged computing environment. Certain representative environment and system components are also shown to illustrate the implementation of these techniques. As used herein, a resource performance predictive model is a collection of one or more models (e.g., neural networks, support vector machines, decision trees, or other prediction models) that employ mathematical techniques to facilitate determining (e.g., predicting) a set of outputs (e.g., outcomes, responses) based on a set of inputs (e.g., stimuli). Such resource performance predictive models can be implemented in hyperconverged computing environments for various purposes. For example, a resource performance predictive model can be implemented to accept a query in the form of inputs comprising characteristics of an expected or planned resource schedule (e.g., workload schedule). The execution of the query produces mathematically-determined results comprising predicted performance metrics (e.g., I/O latency, I/O per second or IOPS, CPU headroom, etc.). Such predictions can facilitate various types of dynamic scheduling such as fine-grained resource deployments and/or fine-grained workload distribution adjustments, workload placement adjustments, and/or other fine-grained dynamic scheduling operations.

Further details regarding general approaches to dynamic scheduling and resource distribution are described in U.S. patent application Ser. No. 15/283,004 titled, "DYNAMIC RESOURCE DISTRIBUTION USING PERIODICITY-AWARE PREDICTIVE MODELING", filed Sep. 30, 2016, which is hereby incorporated by reference in its entirety.

In some cases, the techniques implemented by the predictive model might comprise a set of measurements and/or equations having coefficients that relate (e.g., correlate) one or more of the input variables to one or more of the output variables. In these cases, the equations and coefficients can be determined by a learning process. For highly dynamic, large scale, hyperconverged computing systems, however, an untrained predictive model can exhibit prediction errors during an initial learning phase (e.g., upon deployment).

The predictive model adaptation technique 1A00 and/or other techniques disclosed herein address such technical problems attendant to prediction errors during initial learning phases of resource performance predictive models in dynamic hyperconverged distributed systems. Specifically, predictive model adaptation technique 1A00 can commence with specifying a training system in a training hyperconverged computing environment (step 102). For example, as shown, a training system 124 can be configured in a training hyperconverged computing environment 122. Specifying a system in such hyperconverged environments might include selecting the appliances that provide the computing and storage resources for the system, arranging the selected appliances in a certain interconnection topology, and/or other actions. As can be observed, the foregoing training system is distinguished from a target system 128 in a target hyperconverged computing environment 126. As an example, the target hyperconverged computing environment 126 might be associated with a customer with an interest in implementing an instance of a resource performance predictive model in the customer hyperconverged computing environment (e.g., target hyperconverged computing environment 126). In this example, the training hyperconverged computing environment 122 might correspond to the provider (e.g., developer) of the resource performance predictive model.

Referring again to FIG. 1A, an instance of the resource performance predictive model (e.g., resource performance predictive model $132_1$) is trained in the training environment (step 104). The training of resource performance predictive model $132_1$ generates a set of training model parameters 134 characterizing the predictive model. Such model parameters are a set of data records storing the attributes pertaining to a given state of the predictive model. For example, the training model parameters 134 might comprise the coefficients, constants, and/or other attributes associated with the aforementioned relationships between inputs to outputs as pertaining to the resource performance predictive model $132_1$ at the conclusion of training in the training environment. The pre-trained resource performance predictive model and the training model parameters 134 are then deployed to the target hyperconverged computing environment (step 106).

According to the herein disclosed techniques, the instance of the resource performance predictive model (e.g., resource performance predictive model $132_2$) deployed to the target environment is adapted to the target system 128 in the target hyperconverged computing environment 126 (step 108). The adaptation of the predictive model can be performed dynamically in response to installation of the model in the target system 128. In many cases, the adaptation can complete prior to the initial learning phase of the predictive model in the target environment so as to reduce the prediction errors during such an initial learning phase. As shown, a set of dynamically modified model parameters 136 characterize the state of the resource performance predictive model $132_2$ at the conclusion of the adaptation. The resource performance predictive model $132_2$ can then be used in the target system (step 110) to facilitate various dynamic scheduling (DS) operations, such as workload component placement and/or resource availability scheduling.

As mentioned, the predictive model adaptation technique 1A00 facilitated by the herein disclosed techniques addresses the problems attendant to prediction errors that occur during an initial learning phase of resource performance predictive models in dynamic hyperconverged distributed systems. Various scenarios illustrating predictive model error severity are shown and described as pertaining to FIG. 1B.

Figure 1B:
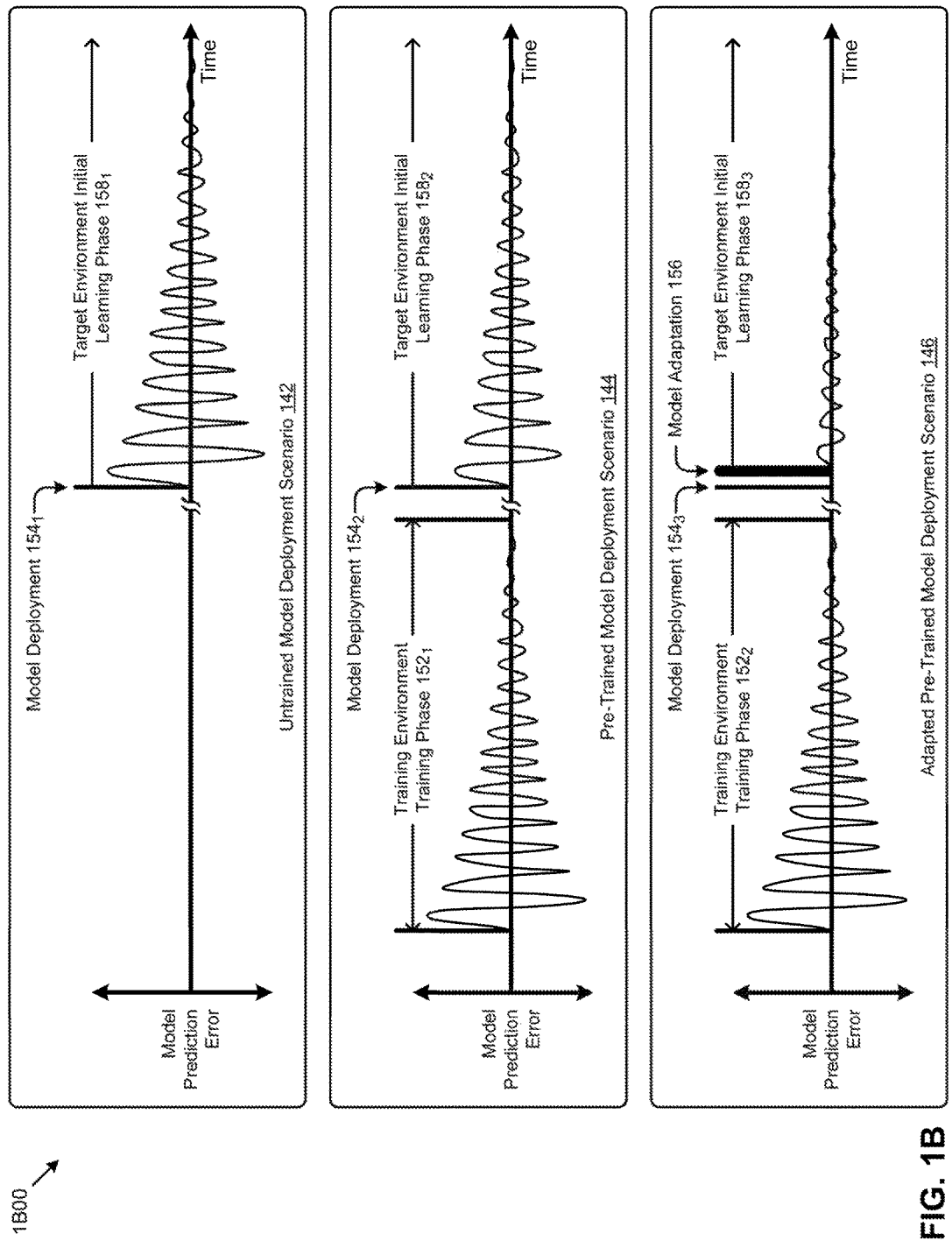
FIG. 1B depicts examples of time-based prediction error responses that characterize predictive model error severity during initial deployment to a target system.

FIG. 1B depicts examples of time-based prediction error responses 1B00 that characterize predictive model error severity during initial deployment to a target system. As an option, one or more variations of time-based prediction error responses 1B00 or any aspect thereof may be implemented in the context of the architecture and functionality of the embodiments described herein. The time-based prediction error responses 1B00 or any aspect thereof may be implemented in any environment.

The time-based prediction error responses 1B00 shown in FIG. 1B are merely examples to illustrate predictive model error severity during initial deployment to a target system. Specifically, examples of such model prediction errors are shown for three scenarios: an untrained model deployment scenario 142, a pre-trained model deployment scenario 144, and an adapted pre-trained model deployment scenario 146. All scenarios depict a time-based error response characteristic (e.g., positive and negative errors) over a certain period of time prior to deployment and a certain period of time after deployment. The prediction errors might be determined, for example, by comparing various predicted values to respective measured values occurring under the corresponding predicted value conditions.

As shown in the untrained model deployment scenario 142, large swings in prediction errors can occur during target environment initial learning phase $158_1$ (e.g., near timeframe of model deployment $154_1$). The prediction errors dampen over time, but the large swings early in the initial learning phase can, for example, introduce resource scheduling inefficiencies (e.g., due to workload redistributions based on prediction errors). The pre-trained model deployment scenario 144 reduces the prediction error swing early in a target environment initial learning phase $158_2$ by training the model in a training environment training phase $152_1$ prior to model deployment $154_2$. While the prediction error swings are indeed reduced in the initial learning phase as a result of the pre-training, the error swings may still impact the efficacy of resource scheduling. Larger error swings in the target environment following pre-training in the training environment are often due to the differences between the two environments.

In the adapted pre-trained model deployment scenario 146, such as implemented by the herein disclosed techniques, the model is trained in a training environment prior to deployment and adapted to the target environment at deployment. Specifically, a given predictive model is trained during a training environment training phase $152_2$ prior to model deployment $154_3$ to a target environment. Upon deployment the predictive model undergoes a model adaptation 156. As a result, the prediction errors during a target environment initial learning phase $158_3$ are significantly reduced. This error reduction in turn results in, for example, more efficient resource scheduling facilitated by a resource performance predictive model upon initial deployment of the model in a highly dynamic, large scale, hyperconverged computing environment.

Figure 2:
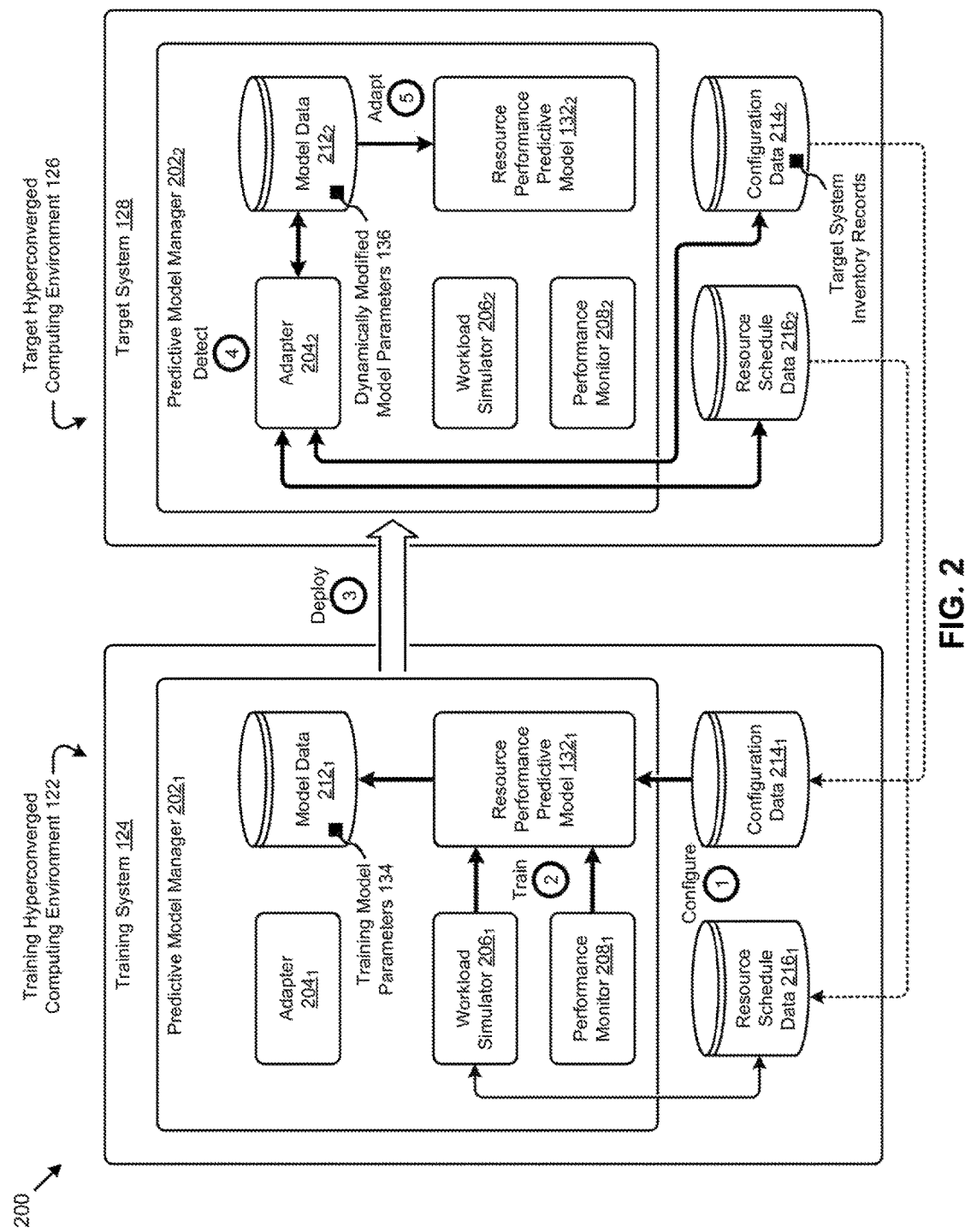
FIG. 2 illustrates techniques used for adapting pre-trained resource performance predictive models to a dynamic hyperconverged computing environment, according to an embodiment.

One embodiment of a subsystem and corresponding data flows for implementing any of the herein disclosed techniques is shown and described as pertaining to FIG. 2.

FIG. 2 illustrates techniques 200 used for adapting pre-trained resource performance predictive models to a dynamic hyperconverged computing environment. As an option, one or more variations of techniques 200 or any aspect thereof may be implemented in the context of the architecture and functionality of the embodiments described herein. The techniques 200 or any aspect thereof may be implemented in any environment.

The embodiment shown in FIG. 2 is merely one implementation of a predictive model manager for managing the earlier described instances of the resource performance predictive model according to the herein disclosed techniques. Specifically, instances of the predictive model manager can facilitate adapting pre-trained resource performance predictive models to dynamic hyperconverged computing environments. As can be observed, the training system 124 in the training hyperconverged computing environment 122 and the target system 128 in the target hyperconverged computing environment 126 can support an instance of such a predictive model manager (e.g., predictive model manager $202_1$ and predictive model manager $202_2$, respectively).

To manage instances of the resource performance predictive models (e.g., resource performance predictive model $132_1$ and resource performance predictive model $132_2$) in each environment, the predictive model manager comprises an adapter (e.g., adapter $204_1$ and adapter $204_2$), a workload simulator (e.g., workload simulator $206_1$ and workload simulator $206_2$), and a performance monitor (e.g., performance monitor $208_1$ and performance monitor $208_2$). Each instance of the resource performance predictive model further has an associated data store for model data (e.g., model data $212_1$ and model data $212_2$). For example, the model data might comprise the earlier described model parameters characterizing the then-current state (e.g., learning state) of the predictive model.

The training system 124 and the target system 128 can further comprise a corresponding set of resource schedule data (e.g., resource schedule data $216_1$ and resource schedule data $216_2$, respectively) and a set of configuration data (e.g., configuration data $214_1$ and configuration data $214_2$, respectively). The resource schedule data comprise data records that describe various attributes pertaining to the resources deployed and/or scheduled for deployment in the system. The resource schedule data are often organized and/or stored in a tabular structure (e.g., relational database table) having rows corresponding to a certain resource or resource consumer (e.g., VE, workload, etc.), and columns corresponding to resource schedule attributes or attribute elements associated with the resource or resource consumer.

For example, a row corresponding to a workload identified as "WL1" might have a node column with the string "N374" to indicate workload WL1 is or will be running on node N374. The configuration data comprise data records that describe various attributes pertaining to the components and/or structure comprising a given hyperconverged distributed system. The configuration data are often organized and/or stored in a tabular structure (e.g., relational database table) having rows corresponding to a certain component (e.g., node, etc.), and columns corresponding to configuration attributes or attribute elements associated with the component. For example, a row corresponding to a node identified as "N749" might have a memory column with the string "192G" to indicate the size of the memory (e.g., 192 GB) configured for node N749.

In some cases, rows comprising a node identification and/or memory size and/or storage capacity, etc. can be populated by accessing computing configuration inventory records so as to look up and aggregate the components and resources available at the target site. For example a set of target configuration inventory records might indicate one instance of a cluster designated as SKU "NX7500", and might further indicate that such a particular instance is named "N749" and is populated with 20 cores, 128 GB of memory, 4T of storage, and "1x10GbE" network IO adapters.

The foregoing components can operate in coordination to implement the herein disclosed techniques as shown in the representative interactions, data flows, and operations of FIG. 2. Specifically, training system 124 can be configured (operation 1) for training of resource performance predictive model $132_1$. Configuration of training system 124 can include selection and arrangement of the components (e.g., nodes) comprising the system (e.g., cluster). The details of this aspect of system configuration are stored in configuration data $214t$. In some cases, and as indicated, the configuration can be based in part on the configuration of the target system 128 as stored in configuration data $214_2$ so as to perform training on the resource performance predictive model $132_1$ using at least some of or all the components and/or topological arrangements pertaining to the target system 128. In many cases, the training system 124 is configured to further include many other component options and combinations so as to train the resource performance predictive model $132_1$ for a wide variety of target hyperconverged computing environments (e.g., pertaining to a broad set of customers). Configuration of training system 124 can further include selection of the resource schedules (e.g., workload placement, workload scheduling, etc.) that will be used as stimulus to the resource performance predictive model $132_1$ during the training operation. The details of this aspect of system configuration are stored in resource schedule data $216_1$. In some cases, and as indicated, the resource schedules can be based in part on the then-current or planned resource schedules of the target system 128 as stored in resource schedule data $216_2$ so as to perform training on the resource performance predictive model $132_1$ using at least some of or all workloads expected to run on the target system 128. In many cases, the scope of the workload schedules used for training the resource performance predictive model $132_1$ is expanded to train the model for a wide variety of workload schedules that might be executed at the target hyperconverged computing environment 126 or other target hyperconverged computing environments (e.g., other customers).

More specifically, as can be observed, a workload simulator $206_1$ accesses the resource schedule data $216_1$ to generate a set of workload schedules to run on training system 124, which workload schedules serve as input stimuli to resource performance predictive model $132_1$. Performance monitor $208_1$ measures and/or calculates (e.g., aggregates) the performance responses to the workload stimuli to facilitate training (operation 2) of the resource performance predictive model $132_1$. In some embodiments, training the model comprises determining correlations between the workload stimuli and the performance responses. As shown, resource performance predictive model $132_1$ can further consume configuration data $214_1$ as inputs to determine correlations between certain aspects of the configuration and the performance responses. Such correlations can be represented in a set of training model parameters 134 stored in model data $212_1$.

When training at the training system 124 is complete, an instance of the predictive model manager including the resource performance predictive model can be deployed (operation 3) to the target hyperconverged computing environment 126. In some cases, merely an instance of the resource performance predictive model represented by the model data comprising the training model parameters 134 is deployed to the target environment. The deployed instance of the model is represented in FIG. 2 as resource performance predictive model $132_2$ and model data $212_2$. According to the herein disclosed techniques, upon deployment of resource performance predictive model $132_2$ to target system 128, adapter $204_2$ (operation 4) detects any environment differences between the target environment and the training environment. In some cases, such environment differences can be detected by comparing configuration data $214_2$ and/or resource schedule data $216_2$ from the target environment to certain data pertaining to the training environment that is deployed in model data $212_2$. The detected environment differences, possibly including differences in workloads to be scheduled, and/or differences in the target computing system as compared to the test system, and/or differences in the target cloud configuration as compared to the test system cloud configuration, etc. are then used to generate a set of dynamically modified model parameters 136 to adapt (operation 5) the resource performance predictive model $132_2$ to the target hyperconverged computing environment 126.

The components and data flows shown in FIG. 2 present merely one partitioning and associated data manipulation approach. The specific example shown is purely exemplary, and other subsystems and/or partitioning are reasonable. Further details describing the aforementioned training operation implemented in such systems, subsystems, and/or partitionings are shown and described as pertaining to FIG. 3.

Figure 3:
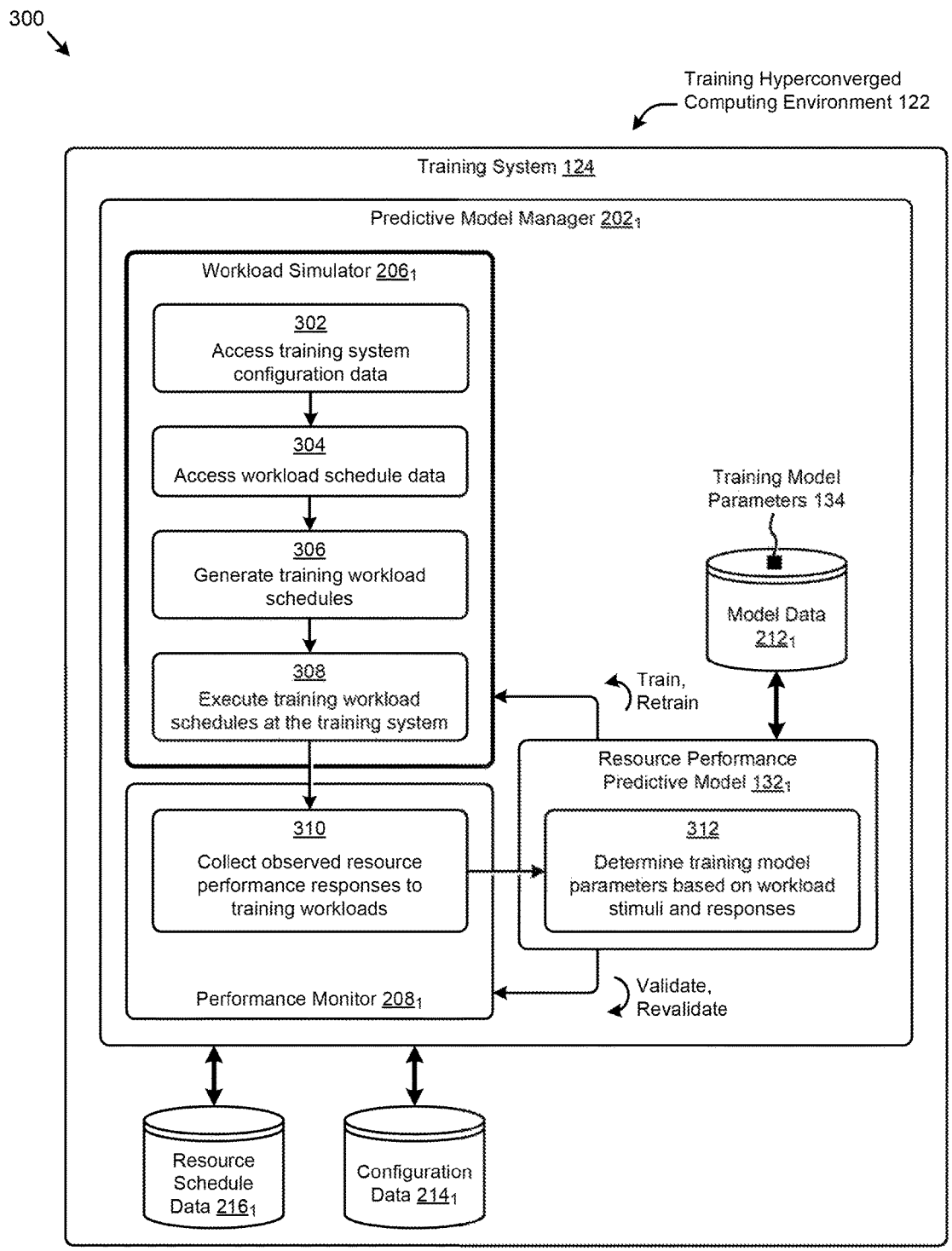
FIG. 3 depicts a predictive model training technique as implemented prior to adapting pre-trained resource performance predictive models to a target hyperconverged computing environment, according to some embodiments.

FIG. 3 depicts a predictive model training technique 300 as implemented prior to adapting pre-trained resource performance predictive models to a target hyperconverged computing environment. As an option, one or more variations of predictive model training technique 300 or any aspect thereof may be implemented in the context of the architecture and functionality of the embodiments described herein. The predictive model training technique 300 or any aspect thereof may be implemented in any environment.

The instance of the workload simulator $206_1$ earlier described is shown in FIG. 3 interacting with the performance monitor $208_1$ and resource performance predictive model $132_1$ to facilitate training of the predictive model in the training hyperconverged computing environment 122. In the embodiment shown, the workload simulator $206_1$ is implemented in the predictive model manager 202 instantiated in training system 124. The predictive model manager $202_1$ and its components also have access to the configuration data $214_1$ and the resource schedule data $216_1$ at the training system 124.

One embodiment of certain steps facilitated by the workload simulator $206_1$ for training the resource performance predictive model $132_1$ can commence with accessing the training system configuration data from, for example, configuration data $214_1$ (step 302). The workload simulator $206_k$ can further access the workload schedule data from, for example, resource schedule data $216_1$ (step 304). The foregoing data and/or other information are used to generate training workload schedules (step 306). In certain embodiments, the training workload schedules are generated so as to train the resource performance predictive model $132_1$ over a scope of workload stimuli that extends beyond what might be observed in any single hyperconverged computing environment targeted for deployment of the model. This facilitates accurate and efficient adaptation of the predictive model to a given hyperconverged computing environment according to the herein disclosed techniques.

The training workload schedules generated at the workload simulator $206_1$ are then executed at the training system 124 (step 308). Observed resource performance responses to the training workloads are collected by the performance monitor $208_1$ (step 310). Such performance responses can be associated with fine-grained aspects (e.g., specific workload, node, etc.) of the training system 124, or aggregated to form an overall performance metric (e.g., I/O latency, etc.) of the training system 124. The resource performance predictive model $132_1$ receives the training workload schedule stimuli and the resource performance responses to determine the training model parameters 134 characterizing the relationship between the stimuli and responses. This training process is repeated for the training workload schedules generated by the workload simulator $206_1$. As an example, an aggregated I/O latency for the training system 124 can have dependencies on (e.g., correlations to) multiple input variables, such as workloads at a given VE, workloads on surrounding VEs (e.g., on the same node), SSD or HDD I/O activity, distributed storage controller loading, and/or other variables. Such input variables are delivered to the resource performance predictive model $132_1$ (e.g., by workload simulator $206_1$, performance monitor $208_1$, etc.) during the training process. The resource performance predictive model $132_1$ can further access configuration data $214_1$ to discover any correlations between the configuration (e.g., node appliance sizing, topology, etc.) and the resource performance responses. The resource performance predictive model can be validated periodically during the course of training. In particular, when determining training model parameters based on workload stimuli (step 312) the model can be validated against a subset of the collected training data collected by the performance monitor to verify various quantifiable aspects of the model such as precision and recall. The model can be trained, validated, retrained (e.g., if the quantifiable aspects of the model are below a threshold), and revalidated in a cycle, as shown.

Figure 4:
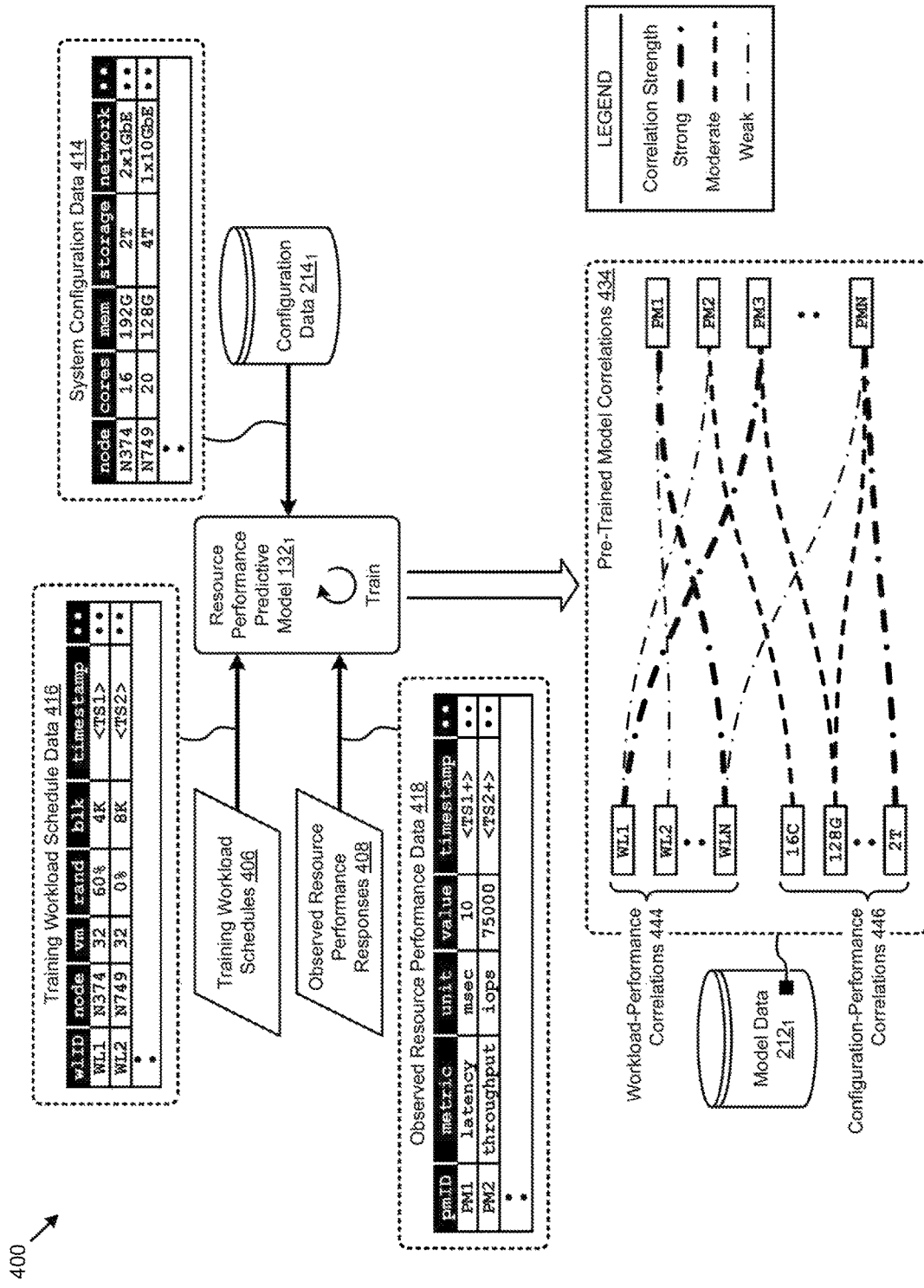
FIG. 4 presents a predictive model response correlation technique as implemented in systems that adapt a pre-trained predictive model to a target hyperconverged computing environment, according to an embodiment.

Further details related to the correlations determined at the resource performance predictive model $132_1$ during the training process are shown and described as pertaining to FIG. 4.

FIG. 4 presents a predictive model response correlation technique 400 as implemented in systems that adapt a pre-trained predictive model to a target hyperconverged computing environment. As an option, one or more variations of predictive model response correlation technique 400 or any aspect thereof may be implemented in the context of the architecture and functionality of the embodiments described herein. The predictive model response correlation technique 400 or any aspect thereof may be implemented in any environment.

The embodiment shown in FIG. 4 is merely one example of the data and data structures pertaining to training a resource performance predictive model according to the herein disclosed techniques. As shown, resource performance predictive model $132_1$ is trained using data corresponding to a set of training workload schedules 406, a set of observed resource performance responses 408, and a set of configuration data $214_1$ to produce a set of pre-trained model correlations 434. Specifically, a tabular representation of the data corresponding to the training workload schedules 406 is shown in a set of training workload schedule data 416. The example entries (e.g., rows) depicted in training workload schedule data 416 indicate that a workload identified as "WL1" at node "N374" consumes "32" VMs, exhibits an average of "60%" random I/O (e.g., 40% sequential I/O) of a "4 K" block size, and starts at a time designated by the shown timestamp. The training workload schedule data 416 further indicates that a workload identified as "WL2" at node "N749" consumes "32" VMs, exhibits an average of "0%" random I/O (e.g., 100% sequential I/O) of an "8K" block size, and starts at a time designated by the shown timestamp. A tabular representation of the data corresponding to the observed resource performance responses 408 is also shown in a set of observed resource performance data 418. The example entries (e.g., rows) depicted in observed resource performance data 418 indicate that a "latency" performance metric identified as "PM1" had a measured and/or calculated value of "10" milliseconds (e.g., "msec") at a time designated by the shown timestamp. The observed resource performance data 418 further indicates that a "throughput" performance metric identified as "PM2" had a measured and/or calculated value of "75000" I/O per second (e.g., "iops") at a time designated by the shown timestamp. Further, a tabular representation of the data corresponding to the configuration data $214_1$ is shown in a set of system configuration data 414. The example entries (e.g., rows) depicted in system configuration data 414 indicate that a node "N374" is configured to have "16" cores, "192G" bytes of memory, "2T" bytes of storage (e.g., SSD and/or HDD), and two 1-gigabit Ethernet networking connections (e.g., "2x1GbE"). The system configuration data 414 further indicates that a node "N749" is configured to have "20" cores, "128G" bytes of memory, "4T" bytes of storage (e.g., SSD and/or HDD), and one 10-gigabit Ethernet networking connections (e.g., "1x10GbE").

The foregoing training workloads and observed resource performance data are merely examples.

Additional details regarding approaches to inspection of workloads and classification of corresponding resource usages are described in U.S. Patent Application titled, "DYNAMIC WORKLOAD CLASSIFICATION" filed on Jan. 27, 2017 Ser. No. 15/418,529 which is hereby incorporated by reference in its entirety.

As can be observed, the foregoing data can be used by a resource performance predictive model $132_1$ to generate the pre-trained model correlations 434. Various predictive model machine-learning techniques can be implemented during the training process to determine the correlations. The model data (e.g., model data $212_1$) resulting from such learning techniques can characterize the correlations between the stimuli and responses exposed to the resource performance predictive model during training. Specifically, a set of workload-performance correlations 444 and a set of configuration-performance correlations 446 are shown to comprise the pre-trained model correlations 434. As illustrated, such correlations can be characterized as weak, moderate, or strong. For example, the correlation strength might correspond to a certain coefficient value associated with one or more equations comprising the predictive model. Stimuli and responses exhibiting no correlation are not represented in the pre-trained model correlations 434. Other levels of granularity for describing correlation strength are possible.

Examples of the workload-performance correlations 444 include a weak correlation between workload "WL1" and performance metric "PM2" and a strong correlation between workload "WL1" and performance metric "PM3". Examples of the configuration-performance correlations 446 include a moderate correlation between a 16-core (e.g., shown as "16C") node and performance metric "PM2", and a strong correlation between a "2T" byte node and performance metric "PMN".

Figure 5A:
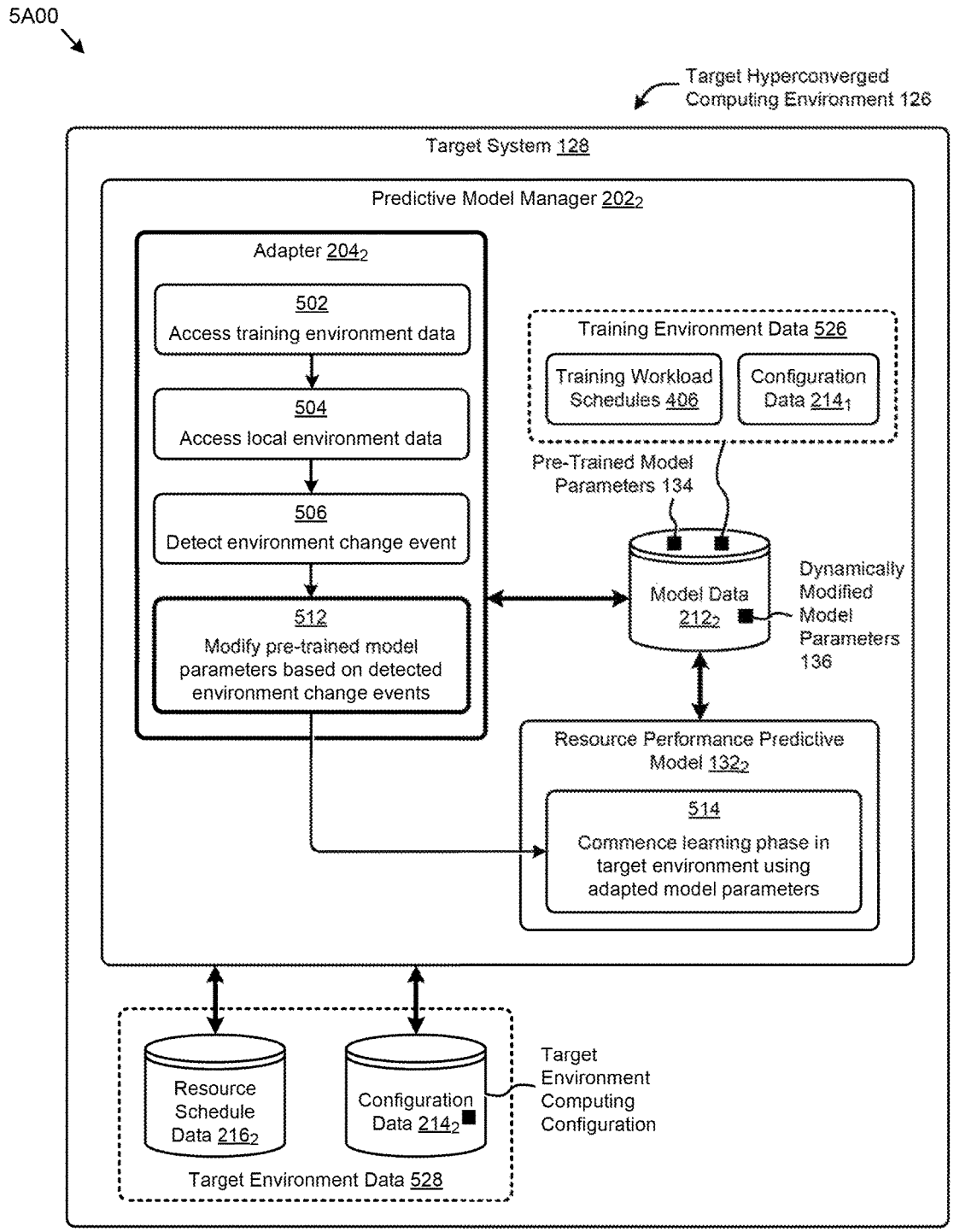
FIG. 5A presents a model parameter adaptation technique as implemented in systems that adapt a pre-trained predictive model to a target hyperconverged computing environment, according to an embodiment.

Further details describing "detect" and "adapt" operations earlier shown and described as pertaining to FIG. 2 are shown and described as pertaining to FIG. 5A.

FIG. 5A presents a model parameter adaptation technique 5A00 as implemented in systems that adapt a pre-trained predictive model to a target hyperconverged computing environment. As an option, one or more variations of model parameter adaptation technique 5A00 or any aspect thereof may be implemented in the context of the architecture and functionality of the embodiments described herein. The model parameter adaptation technique 5A00 or any aspect thereof may be implemented in any environment.

The instance of the adapter $204_2$ earlier described is shown in FIG. 5A interacting with the model data $212_2$ and the resource performance predictive model $132_2$ to facilitate adapting the predictive model to the target hyperconverged computing environment 126. In the embodiment shown, the adapter $204_2$ is implemented in the predictive model manager $202_2$ instantiated in target system 128. The predictive model manager $202_2$ and its components also have access to the configuration data $214_2$ and the resource schedule data $216_2$ at the target system 128.

In one embodiment, steps for adapting the resource performance predictive model $132_2$ to the target environment can commence with accessing the training environment data from, for example, model data $212_2$ (step 502). Specifically, as an option, a set of training environment data 526 comprising the training workload schedules 406, the configuration data $214_k$ of the training system, and/or other information can be stored in the instance of the model data $212_2$ that is deployed in the target environment. Adapter $204_2$ can also access the target environment data such as is shown pertaining to step 504. For example, the adapter can access the target environment data 528 comprising the resource schedule data $216_2$ and the configuration data $214_2$ corresponding to the target system 128 in the target hyperconverged computing environment 126. The adapter $204_2$ can use the foregoing environment data to detect an environment change event (at step 506). For example, the environment change event might be detected based on one or more environment differences between the training environment and the target environment. In some embodiments, an environment change event might be detected based on a transition from an earlier state of the target environment to a then-current state of the target environment.

In any case, the detected environment change event invokes a modification of the then-current model parameters (e.g., the training model parameters 134 or derivatives thereof) to dynamically adapt the resource performance predictive model to the target environment (step 512). In certain embodiments, the model parameters are modified based on the environment differences associated with the environment change event. A learning phase of the resource performance predictive model $132_2$ can commence using the adapted model parameters (e.g., dynamically modified model parameters 136) (step 514).

Various techniques can be implemented to perform the foregoing model parameter modification. One such technique is shown and described as pertaining to FIG. 5B.

Figure 5B:
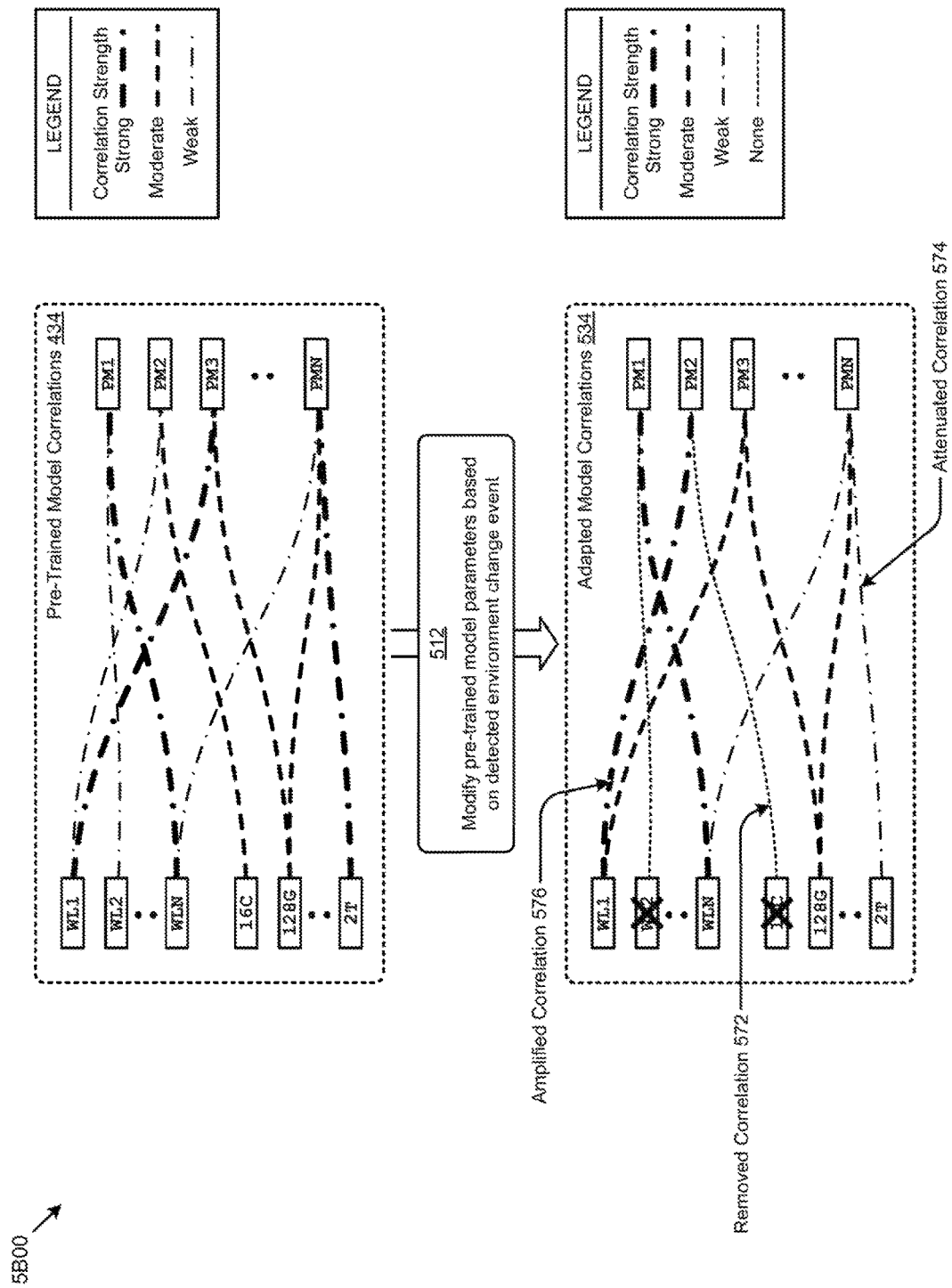
FIG. 5B illustrates a correlation modification technique for adapting model parameters in systems that adapt a pre-trained predictive model to a target hyperconverged computing environment, according to an embodiment.

FIG. 5B illustrates a correlation modification technique 5B00 for adapting model parameters in systems that adapt a pre-trained predictive model to a target hyperconverged computing environment. As an option, one or more variations of correlation modification technique 5B00 or any aspect thereof may be implemented in the context of the architecture and functionality of the embodiments described herein. The correlation modification technique 5B00 or any aspect thereof may be implemented in any environment.

FIG. 5B presents the earlier described example representative correlations (e.g., pre-trained model correlations 434) that might result from training a resource performance predictive model in a training environment. When the predictive model is deployed to a target environment, the herein disclosed techniques can be implemented to modify the pre-trained model correlations 434 characterized by the pre-trained model parameters to adapt the predictive model to the target environment based on detected environment changes (step 512). Specifically, in the embodiment shown in FIG. 5B, the adaptation (e.g., parameter modification) results in a set of adapted model correlations 534.

As can be observed in the adapted model correlations 534, the detected environment changes or differences might indicate "WL2" workloads and 16-core (e.g., "16C") nodes are not present in the then-current target environment. As such, correlations associated with such stimuli are removed (e.g., removed correlation 572). Other correlations might be attenuated (e.g., attenuated correlation 574) or amplified (e.g., amplified correlation 576) based on various environment data. For example, a correlation between a stimulus (e.g., "2T") and a response (e.g., "PMN") might be attenuated or amplified based on the frequency of occurrence of the stimulus as compared to the frequency of occurrence of other stimuli (e.g., "WLN" and "128G") correlated to the response. In some cases, a correlation might be time-shifted based on observed environment data.

Figure 6:
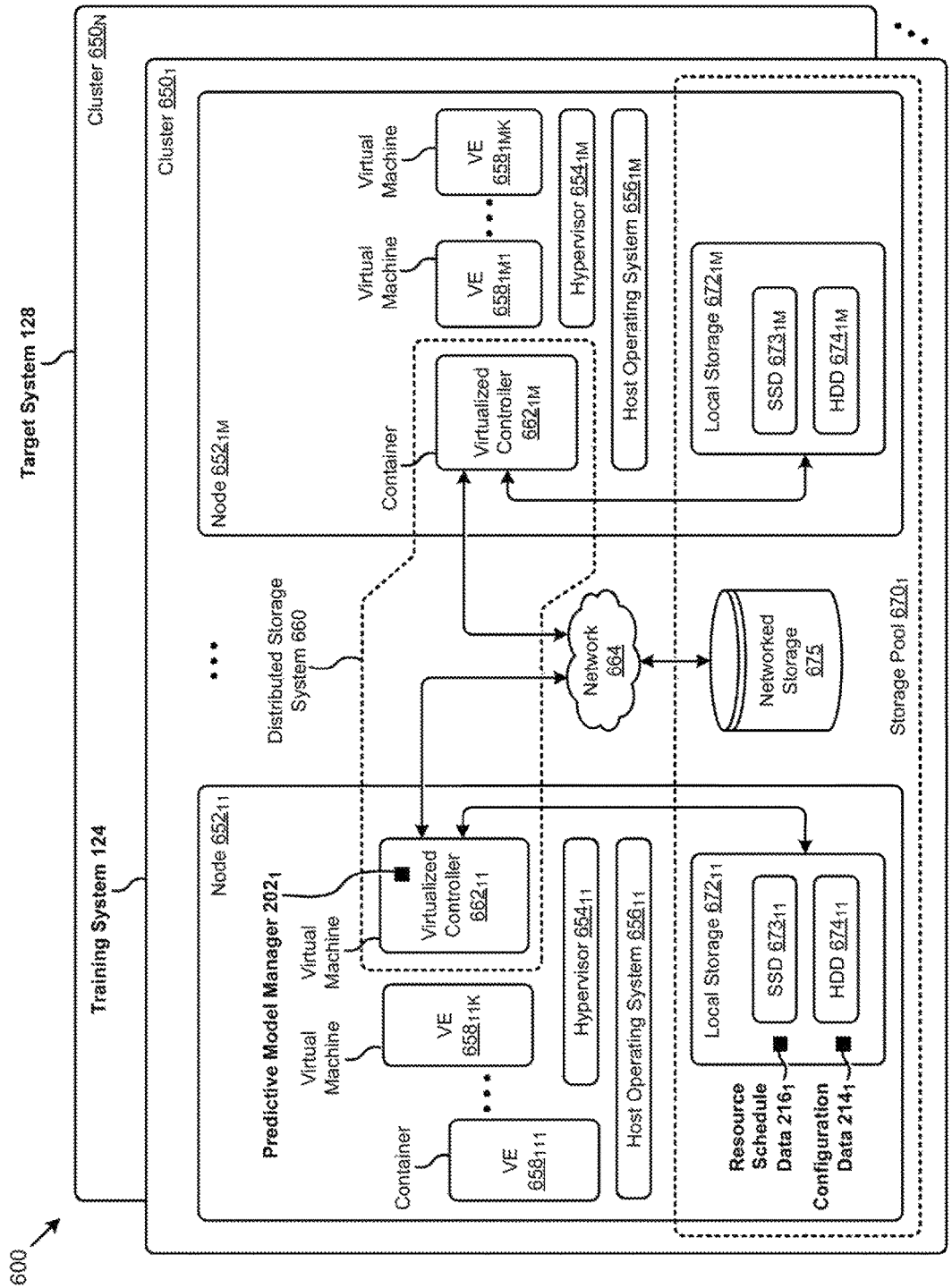
FIG. 6 depicts a distributed virtualization environment in which embodiments of the present disclosure can operate, according to an embodiment.

One embodiment of an environment for implementing any of the herein disclosed techniques is shown and described as pertaining to FIG. 6.

FIG. 6 depicts a distributed virtualization environment 600 in which embodiments of the present disclosure can operate. As an option, one or more variations of distributed virtualization environment 600 or any aspect thereof may be implemented in the context of the architecture and functionality of the embodiments described herein. The distributed virtualization environment 600 or any aspect thereof may be implemented in any environment.

The shown distributed virtualization environment depicts various components associated with one instance of a distributed virtualization system (e.g., hyperconverged distributed system) comprising a distributed storage system 660 that can be used to implement the herein disclosed techniques. Specifically, the distributed virtualization environment 600 comprises multiple clusters (e.g., cluster $650_1, \ldots,$ cluster $650_N$) comprising multiple nodes that have multiple tiers of storage in a storage pool. Representative nodes (e.g., node $652_{11}, \ldots,$ node $652_{1M}$) and storage pool $670_1$ associated with cluster $650_1$ are shown. Each node can be associated with one server, multiple servers, or portions of a server. The nodes can be associated (e.g., logically and/or physically) with the clusters. As shown, the multiple tiers of storage include storage that is accessible through a network 664, such as a networked storage 675 (e.g., a storage area network or SAN, network attached storage or NAS, etc.). The multiple tiers of storage further include instances of local storage (e.g., local storage $672_{11}, \ldots,$ local storage $672_{1M}$). For example, the local storage can be within or directly attached to a server and/or appliance associated with the nodes. Such local storage can include solid state drives (SSD $673_{11}, \ldots,$ SSD $673_{1M}$), hard disk drives (HDD $674_{11}, \ldots,$ HDD $674_{1M}$), and/or other storage devices.

As shown, the nodes in distributed virtualization environment 600 can implement one or more user virtualized entities (e.g., VE $658_{111}, \ldots,$ VE $658_{11K}, \ldots,$ VE $658_{1M1}, \ldots,$ VE $658_{1MK}$), such as virtual machines (VMs) and/or containers. The VMs can be characterized as software-based computing "machines" implemented in a hypervisor-assisted virtualization environment that emulates the underlying hardware resources (e.g., CPU, memory, etc.) of the nodes. For example, multiple VMs can operate on one physical machine (e.g., node host computer) running a single host operating system (e.g., host operating system $656_{11}, \ldots,$ host operating system $656_{1M}$), while the VMs run multiple applications on various respective guest operating systems. Such flexibility can be facilitated at least in part by a hypervisor (e.g., hypervisor $654_{11}, \ldots,$ hypervisor $654_{1M}$), which hypervisor is logically located between the various guest operating systems of the VMs and the host operating system of the physical infrastructure (e.g., node).

As an example, hypervisors can be implemented using virtualization software (e.g., VMware ESXi, Microsoft Hyper-V, RedHat KVM, Nutanix AHV, etc.) that includes a hypervisor. In comparison, the containers (e.g., application containers or ACs) are implemented at the nodes in an operating system virtualization environment or container virtualization environment. The containers comprise groups of processes and/or resources (e.g., memory, CPU, disk, etc.) that are isolated from the node host computer and other containers. Such containers directly interface with the kernel of the host operating system (e.g., host operating system $656_1$, . . . , host operating system $656_{1M}$) without, in most cases, a hypervisor layer. This lightweight implementation can facilitate efficient distribution of certain software components, such as applications or services (e.g., micro-services). As shown, distributed virtualization environment 600 can implement both a hypervisor-assisted virtualization environment and a container virtualization environment for various purposes.

Distributed virtualization environment 600 also comprises at least one instance of a virtualized controller to facilitate access to storage pool $670_1$ by the VMs and/or containers.

As used in these embodiments, a virtualized controller is a collection of software instructions that serve to abstract details of underlying hardware or software components from one or more higher-level processing entities. A virtualized controller can be implemented as a virtual machine, as a container (e.g., a Docker container), or within a layer (e.g., such as a hypervisor).

Multiple instances of such virtualized controllers can coordinate within a cluster to form the distributed storage system 660 which can, among other operations, manage the storage pool $670_1$. This architecture further facilitates efficient scaling of the distributed virtualization system. The foregoing virtualized controllers can be implemented in distributed virtualization environment 600 using various techniques. Specifically, an instance of a virtual machine at a given node can be used as a virtualized controller in a hypervisor-assisted virtualization environment to manage storage and I/O activities. In this case, for example, the virtualize entities at node $652_{11}$ can interface with a controller virtual machine (e.g., virtualized controller $662_{11}$) through hypervisor $654_{11}$ to access the storage pool $670_1$. In such cases, the controller virtual machine is not formed as part of specific implementations of a given hypervisor. Instead, the controller virtual machine can run as a virtual machine above the hypervisor at the various node host computers. When the controller virtual machines run above the hypervisors, varying virtual machine architectures and/or hypervisors can operate with the distributed storage system 660.

For example, a hypervisor at one node in the distributed storage system 660 might correspond to VMware ESXi software, and a hypervisor at another node in the distributed storage system 660 might correspond to Nutanix AHV software. As another virtualized controller implementation example, containers (e.g., Docker containers) can be used to implement a virtualized controller (e.g., virtualized controller $662_{1M}$) in an operating system virtualization environment at a given node. In this case, for example, the virtualized entities at node $652_{1M}$ can access the storage pool $670_1$ by interfacing with a controller container (e.g., virtualized controller $662_{1M}$) through hypervisor $654_{1M}$ and/or the kernel of host operating system $656_{1M}$.

In certain embodiments, one or more instances of a predictive model manager can be implemented in the distributed storage system 660 to facilitate the herein disclosed techniques. Specifically, predictive model manager $202_1$ can be implemented in the virtualized controller $662_{11}$. Such instances of the predictive model manager can be implemented in any node in any cluster and can manage the predictive model capabilities of the cluster, a portion of the cluster, or multiple clusters. As an example, predictive model manager $202_1$ might facilitate training of a resource performance predictive model at cluster $650_1$ identified to be the training system 124, and another instance of the predictive model manager might facilitate adapting the resource performance predictive model to cluster $650_N$ identified as the target system 128. As shown, the local storage facilities at a selected (e.g., leader) node from the cluster can store instances of the resource schedule data (e.g., resource schedule data $216_1$) and configuration data (e.g., configuration data $214_1$) for use by the various predictive model managers according to the herein disclosed techniques.

ADDITIONAL EMBODIMENTS OF THE DISCLOSURE

Additional Practical Application Examples

Figure 7:
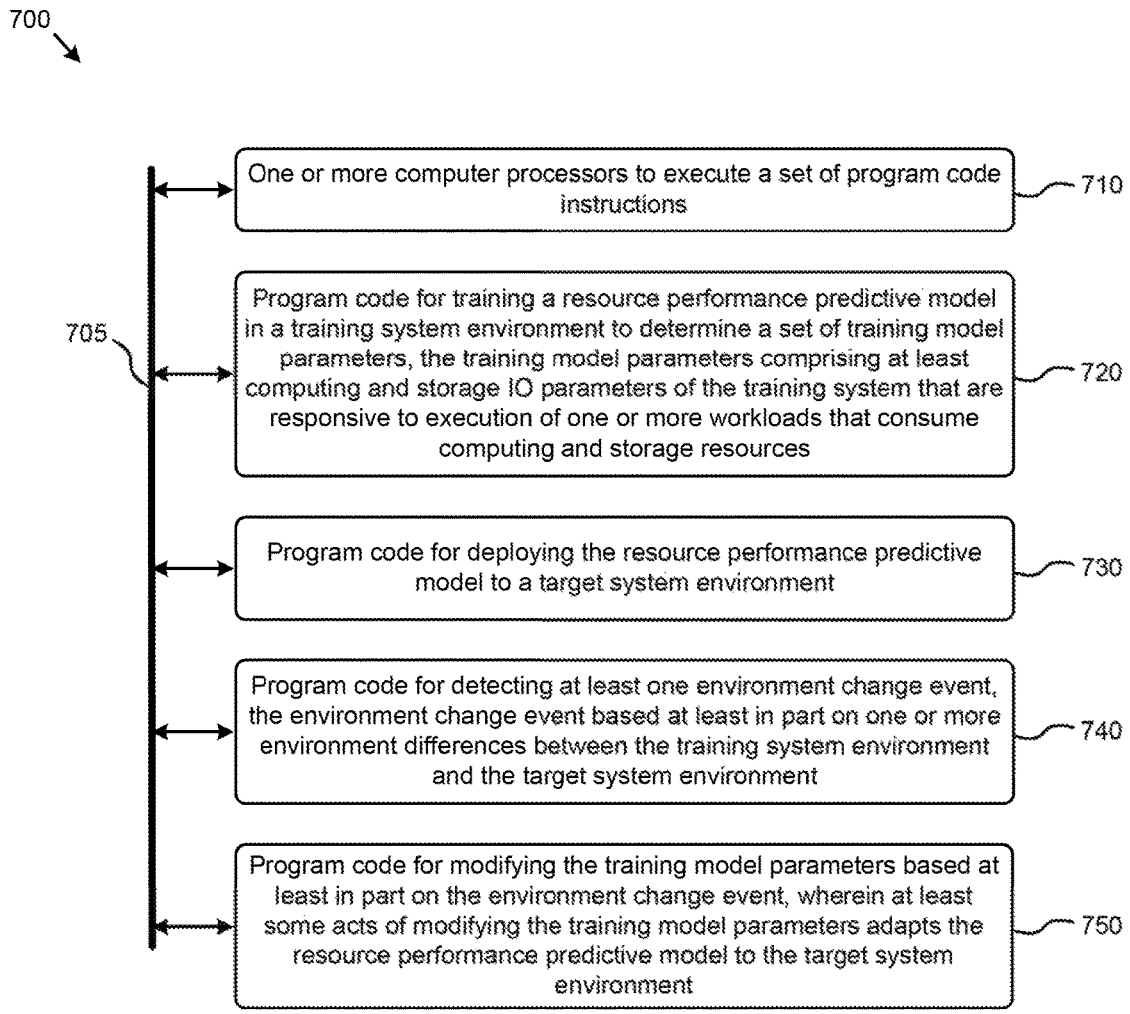
FIG. 7 depicts system components as arrangements of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that individually, and/or as combined, serve to implement improved technological processes that reduce prediction errors during initial learning phases of resource performance predictive models in dynamic hyperconverged distributed systems.

The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment.

The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims.

The shown embodiment implements a portion of a computer system, presented as system 700, comprising a computer processor to execute a set of program code instructions (module 710) and modules for accessing memory to hold program code instructions to perform: training a resource performance predictive model in a training system environment to determine a set of training model parameters, the training model parameters comprising at least computing and storage IO parameters of the training system that are responsive to execution of one or more workloads that consume computing and storage resources (module 720); deploying the resource performance predictive model to a target system environment (module 730); detecting at least one environment change event, the environment change event based at least in part on one or more environment differences between the training system environment and the target system environment (module 740); and modifying the training model parameters based at least in part on the environment change event, wherein at least some acts of modifying the training model parameters adapts the resource performance predictive model to the target system environment (module 750).

Figure 8A:
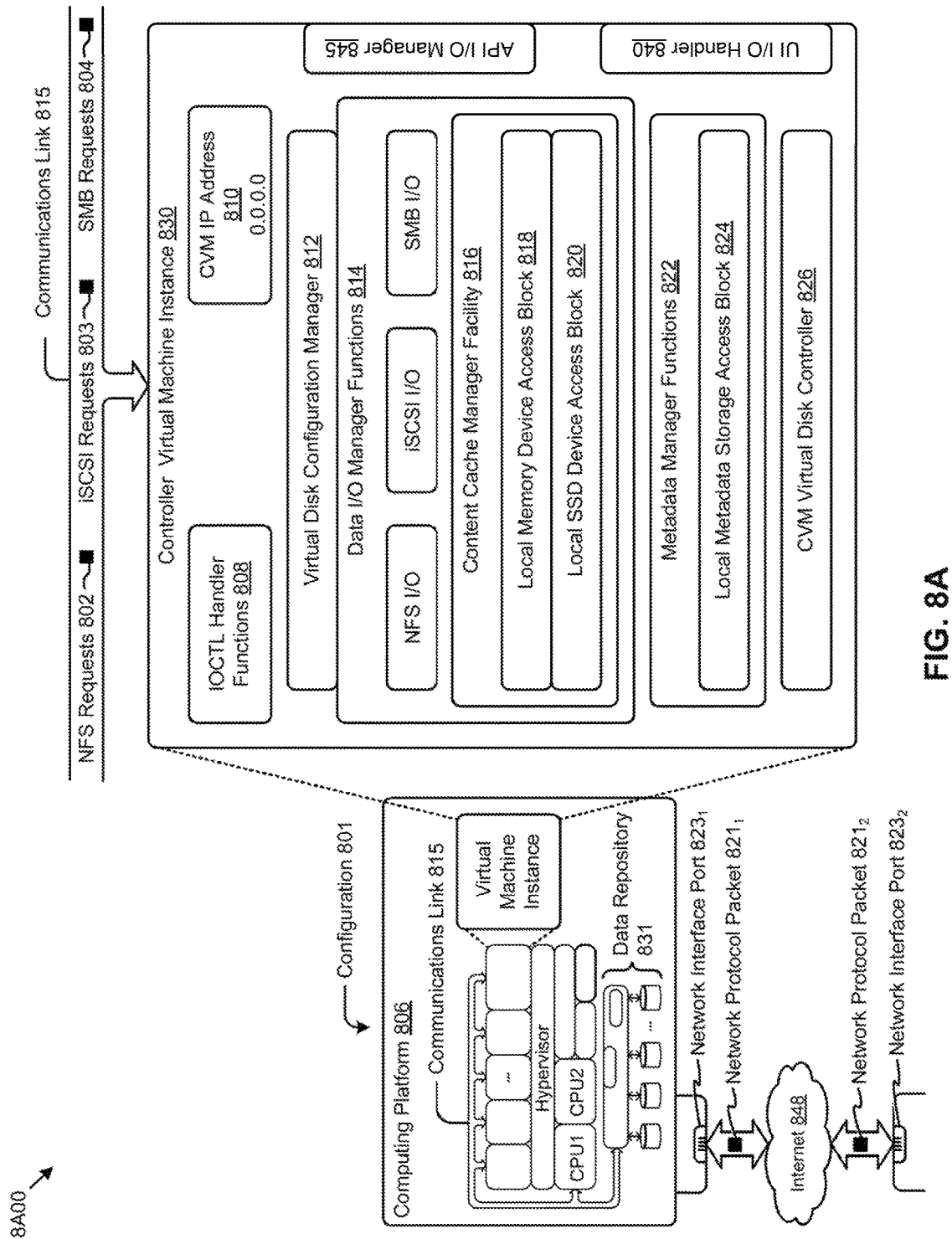
FIG. 8A and FIG. 8B depict virtualized controller architectures comprising collections of interconnected components suitable for implementing embodiments of the present disclosure and/or for use in the herein-described environments.

Variations of the foregoing may include more or fewer of the shown modules. Certain variations may perform more or fewer (or different) steps, and/or certain variations may use data elements in more, or in fewer (or different) operations.
System Architecture Overview
Additional System Architecture Examples FIG. 8A depicts a virtualized controller as implemented by the shown virtual machine architecture 8A00. The heretofore-disclosed embodiments including variations of any virtualized controllers can be implemented in distributed systems where a plurality of networked-connected devices communicate and coordinate actions using inter-component messaging. Distributed systems are systems of interconnected components that are designed for or dedicated to storage operations as well as being designed for, or dedicated to, computing and/or networking operations. Interconnected components in a distributed system can operate cooperatively so as to serve a particular objective, such as to provide high-performance computing, high-performance networking capabilities, and/or high performance storage and/or high capacity storage capabilities. For example, a first set of components of a distributed computing system can coordinate to efficiently use a set of computational or compute resources, while a second set of components of the same distributed storage system can coordinate to efficiently use a set of data storage facilities.

A hyperconverged system coordinates efficient use of compute and storage resources by and between the components of the distributed system. Adding a hyperconverged unit to a hyperconverged system expands the system in multiple dimensions. As an example, adding a hyperconverged unit to a hyperconverged system can expand in the dimension of storage capacity while concurrently expanding in the dimension of computing capacity and also in the dimension of networking bandwidth. Components of any of the foregoing distributed systems can comprise physically and/or logically distributed autonomous entities.

Physical and/or logical collections of such autonomous entities can sometimes be referred to as nodes. In some hyperconverged systems, compute and storage resources can be integrated into a unit of a node. Multiple nodes can be interrelated into an array of nodes, which nodes can be grouped into physical groupings (e.g., arrays) and/or into logical groupings or topologies of nodes (e.g., spoke-and-wheel topologies, rings, etc.). Some hyperconverged systems implement certain aspects of virtualization. For example, in a hypervisor-assisted virtualization environment, certain of the autonomous entities of a distributed system can be implemented as virtual machines. As another example, in some virtualization environments, autonomous entities of a distributed system can be implemented as containers. In some systems and/or environments, hypervisor-assisted virtualization techniques and operating system virtualization techniques are combined.

As shown, the virtual machine architecture 8A00 comprises a collection of interconnected components suitable for implementing embodiments of the present disclosure and/or for use in the herein-described environments. Moreover, the shown virtual machine architecture 8A00 includes a virtual machine instance in a configuration 801 that is further described as pertaining to the controller virtual machine instance 830. A controller virtual machine instance receives block I/O (input/output or IO) storage requests as network file system (NFS) requests in the form of NFS requests 802, and/or internet small computer storage interface (iSCSI) block IO requests in the form of iSCSI requests 803, and/or Samba file system (SMB) requests in the form of SMB requests 804. The controller virtual machine (CVM) instance publishes and responds to an internet protocol (IP) address (e.g., CVM IP address 810). Various forms of input and output (I/O or IO) can be handled by one or more IO control handler functions (e.g., IOCTL functions 808) that interface to other functions such as data IO manager functions 814 and/or metadata manager functions 822. As shown, the data IO manager functions can include communication with a virtual disk configuration manager 812 and/or can include direct or indirect communication with any of various block IO functions (e.g., NFS IO, iSCSI IO, SMB IO, etc.).

In addition to block IO functions, the configuration 801 supports IO of any form (e.g., block IO, streaming IO, packet-based IO, HTTP traffic, etc.) through either or both of a user interface (UI) handler such as UI IO handler 840 and/or through any of a range of application programming interfaces (APIs), possibly through the shown API IO manager 845.

The communications link 815 can be configured to transmit (e.g., send, receive, signal, etc.) any types of communications packets comprising any organization of data items. The data items can comprise a payload data, a destination address (e.g., a destination IP address) and a source address (e.g., a source IP address), and can include various packet processing techniques (e.g., tunneling), encodings (e.g., encryption), and/or formatting of bit fields into fixed-length blocks or into variable length fields used to populate the payload. In some cases, packet characteristics include a version identifier, a packet or payload length, a traffic class, a flow label, etc. In some cases the payload comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to a data processor for execution. Such a medium may take many forms including, but not limited to, non-volatile media and volatile media. Non-volatile media includes any non-volatile storage medium, for example, solid state storage devices (SSDs) or optical or magnetic disks such as disk drives or tape drives. Volatile media includes dynamic memory such as a random access memory. As shown, the controller virtual machine instance 830 includes a content cache manager facility 816 that accesses storage locations, possibly including local dynamic random access memory (DRAM) (e.g., through the local memory device access block 818) and/or possibly including accesses to local solid state storage (e.g., through local SSD device access block 820).

Common forms of computer readable media includes any non-transitory computer readable medium, for example, floppy disk, flexible disk, hard disk, magnetic tape, or any other magnetic medium; CD-ROM or any other optical medium; punch cards, paper tape, or any other physical medium with patterns of holes; or any RAM, PROM, EPROM, FLASH-EPROM, or any other memory chip or cartridge. Any data can be stored, for example, in any form of external data repository 831, which in turn can be formatted into any one or more storage areas, and which can comprise parameterized storage accessible by a key (e.g., a filename, a table name, a block address, an offset address, etc.). An external data repository 831 can store any forms of data, and may comprise a storage area dedicated to storage of metadata pertaining to the stored forms of data. In some cases, metadata, can be divided into portions. Such portions and/or cache copies can be stored in the external storage data repository and/or in a local storage area (e.g., in local DRAM areas and/or in local SSD areas). Such local storage can be accessed using functions provided by a local metadata storage access block 824. The external data repository 831 can be configured using a CVM virtual disk controller 826, which can in turn manage any number or any configuration of virtual disks.

Execution of the sequences of instructions to practice certain embodiments of the disclosure are performed by a one or more instances of a software instruction processor, or a processing element such as a data processor, or such as a central processing unit (e.g., CPU1, CPU2). According to certain embodiments of the disclosure, two or more instances of a configuration 801 can be coupled by a communications link 815 (e.g., backplane, LAN, PTSN, wired or wireless network, etc.) and each instance may perform respective portions of sequences of instructions as may be required to practice embodiments of the disclosure.

The shown computing platform 806 is interconnected to the Internet 848 through one or more network interface ports (e.g., network interface port $823_1$ and network interface port $823_2$). The configuration 801 can be addressed through one or more network interface ports using an IP address. Any operational element within computing platform 806 can perform sending and receiving operations using any of a range of network protocols, possibly including network protocols that send and receive packets (e.g., network protocol packet $821_1$ and network protocol packet $821_2$).

The computing platform 806 may transmit and receive messages that can be composed of configuration data, and/or any other forms of data and/or instructions organized into a data structure (e.g., communications packets). In some cases, the data structure includes program code instructions (e.g., application code) communicated through Internet 848 and/or through any one or more instances of communications link 815. Received program code may be processed and/or executed by a CPU as it is received and/or program code may be stored in any volatile or non-volatile storage for later execution. Program code can be transmitted via an upload (e.g., an upload from an access device over the Internet 848 to computing platform 806). Further, program code and/or results of executing program code can be delivered to a particular user via a download (e.g., a download from the computing platform 806 over the Internet 848 to an access device).

The configuration 801 is merely one sample configuration. Other configurations or partitions can include further data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A cluster is often embodied as a collection of computing nodes that can communicate between each other through a local area network (e.g., LAN or VLAN) or a backplane. Some clusters are characterized by assignment of a particular set of the aforementioned computing nodes to access a shared storage facility that is also configured to communicate over the local area network or backplane. In many cases, the physical bounds of a cluster is defined by a mechanical structure such as a cabinet or chassis or rack that hosts a finite number of mounted-in computing units. A computing unit in a rack can take on a role as a server, or as a storage unit, or as a networking unit, or any combination therefrom. In some cases a unit in a rack is dedicated to provision of power to the other units. In some cases a unit in a rack is dedicated to environmental conditioning functions such as filtering and movement of air through the rack, and/or temperature control for the rack. Racks can be combined to form larger clusters. For example, the LAN of a first rack having 32 computing nodes can be interfaced with the LAN of a second rack having 16 nodes to form a two-rack cluster of 48 nodes. The former two LANs can be configured as subnets, or can be configured as one VLAN. Multiple clusters can communicate between one module to another over a WAN (e.g., when geographically distal) or LAN (e.g., when geographically proximal).

A module as used herein can be implemented using any mix of any portions of memory and any extent of hard-wired circuitry including hard-wired circuitry embodied as a data processor. Some embodiments of a module include one or more special-purpose hardware components (e.g., power control, logic, sensors, transducers, etc.). A data processor can be organized to execute a processing entity that is configured to execute as a single process or configured to execute using multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

Some embodiments of a module include instructions that are stored in a memory for execution so as to implement algorithms that facilitate operational and/or performance characteristics pertaining to adapting pre-trained resource performance predictive models to a dynamic hyperconverged computing environment. In some embodiments, a module may include one or more state machines and/or sets of combinational logic used to implement or facilitate the operational and/or performance characteristics pertaining to adapting pre-trained resource performance predictive models to a dynamic hyperconverged computing environment.

Various implementations of the data repository comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of adapting pre-trained resource performance predictive models to a dynamic hyperconverged computing environment). Such files or records can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to adapting pre-trained resource performance predictive models to a dynamic hyperconverged computing environment, and/or for improving the way data is manipulated when performing computerized operations pertaining to dynamically adapting a pre-trained resource performance predictive model upon deployment of the model to a target hyperconverged distributed computing environment.

Further details regarding general approaches to managing data repositories are described in U.S. Pat. No. 8,601,473 titled, "ARCHITECTURE FOR MANAGING I/O AND STORAGE FOR A VIRTUALIZATION ENVIRONMENT" issued on Dec. 3, 2013, which is hereby incorporated by reference in its entirety.

Further details regarding general approaches to managing and maintaining data in data repositories are described in U.S. Pat. No. 8,549,518 titled, "METHOD AND SYSTEM FOR IMPLEMENTING MAINTENANCE SERVICE FOR MANAGING L/O AND STORAGE FOR A VIRTUALIZATION ENVIRONMENT" issued on Oct. 1, 2013, which is hereby incorporated by reference in its entirety.

Figure 8B:
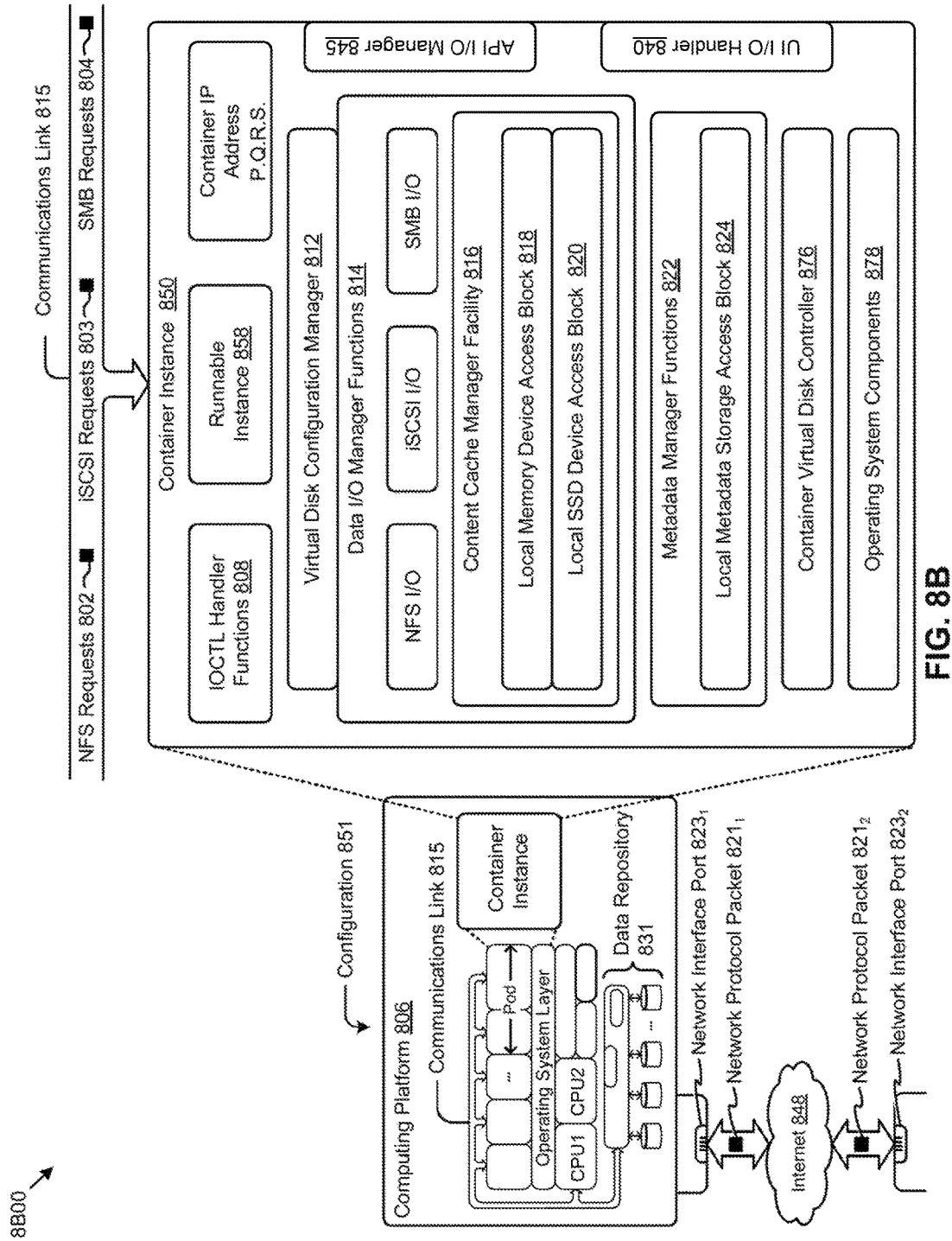

FIG. 8B depicts a virtualized controller implemented by a containerized architecture 8B00. The containerized architecture comprises a collection of interconnected components suitable for implementing embodiments of the present disclosure and/or for use in the herein-described environments. Moreover, the shown containerized architecture 8B00 includes a container instance in a configuration 851 that is further described as pertaining to the container instance 850. The configuration 851 includes an operating system layer (as shown) that performs addressing functions such as providing access to external requestors via an IP address (e.g., "P.Q.R.S", as shown). Providing access to external requestors can include implementing all or portions of a protocol specification (e.g., "http:") and possibly handling port-specific functions.

The operating system layer can perform port forwarding to any container (e.g., container instance 850). A container instance can be executed by a processor. Runnable portions of a container instance sometimes derive from a container image, which in turn might include all, or portions of any of, a Java archive repository (JAR) and/or its contents, and/or a script or scripts and/or a directory of scripts, and/or a virtual machine configuration, and may include any dependencies therefrom. In some cases a configuration within a container might include an image comprising a minimum set of runnable code. Contents of larger libraries and/or code or data that would not be accessed during runtime of the container instance can be omitted from the larger library to form a smaller library composed of only the code or data that would be accessed during runtime of the container instance. In some cases, start-up time for a container instance can be much faster than start-up time for a virtual machine instance, at least inasmuch as the container image might be much smaller than a respective virtual machine instance. Furthermore, start-up time for a container instance can be much faster than start-up time for a virtual machine instance, at least inasmuch as the container image might have many fewer code and/or data initialization steps to perform than a respective virtual machine instance.

A container instance (e.g., a Docker container) can serve as an instance of an application container. Any container of any sort can be rooted in a directory system, and can be configured to be accessed by file system commands (e.g., "ls" or "ls-a", etc.). The container might optionally include operating system components 878, however such a separate set of operating system components need not be provided. As an alternative, a container can include a runnable instance 858, which is built (e.g., through compilation and linking, or just-in-time compilation, etc.) to include all of the library and OS-like functions needed for execution of the runnable instance. In some cases, a runnable instance can be built with a virtual disk configuration manager, any of a variety of data IO management functions, etc. In some cases, a runnable instance includes code for, and access to, a container virtual disk controller 876. Such a container virtual disk controller can perform any of the functions that the aforementioned CVM virtual disk controller 826 can perform, yet such a container virtual disk controller does not rely on a hypervisor or any particular operating system so as to perform its range of functions.

In some environments multiple containers can be collocated and/or can share one or more contexts. For example, multiple containers that share access to a virtual disk can be assembled into a pod (e.g., a Kubernetes pod). Pods provide sharing mechanisms (e.g., when multiple containers are amalgamated into the scope of a pod) as well as isolation mechanisms (e.g., such that the namespace scope of one pod does not share the namespace scope of another pod).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method, comprising:
    training a model into a trained model, wherein the model comprises a set of trained model parameters to capture resource consumption of computing and storage resources of a workload in a first computing environment, and the first computing environment is characterized by a first configuration;
    detecting a difference between the first computing environment and a second computing environment characterized by a second configuration, wherein
        the first configuration comprises at least a portion of the second configuration so that the first computing environment in which the model is trained comprises a computing node that is also in the second computing environment into which the trained model is to be deployed; and
    deploying the trained model to the second computing environment at least by adapting the trained model to the second computing environment, wherein adapting the trained model comprises modifying the set of model parameters based at least in part on the difference prior to conclusion of adapting the trained model to the second computing environment.

2. The method of claim 1, wherein the difference comprises a configuration difference between a target system configuration and a training system configuration.

3. The method of claim 1, wherein training the model comprises:
    determining a storage IO performance characteristic at least by executing a training workload schedule in the first computing environment, wherein the trained model is adapted to the second computing environment based further at least in part upon the storage IO performance characteristic.

4. The method of claim 1, wherein the first computing environment corresponds to a training workload schedule, the second computing environment corresponds to a target workload schedule, and the training workload schedule comprises at least a portion of the target workload schedule.

5. The method of claim 1, wherein the first computing environment corresponds to a training workload schedule, the second computing environment corresponds to a target workload schedule, and the difference comprises a workload schedule difference between the target workload schedule and the training workload schedule.

6. The method of claim 1, wherein modifying the set of model parameters is performed prior to commencing a learning phase during which a relationship between an input and an output of the trained model is determined for the second computing environment in the second computing environment.

7. The method of claim 1, wherein the set of model parameters characterizes a correlation between a stimulus and a response in the first computing environment.

8. The method of claim 7, wherein modifying the set of model parameters comprises at least one of removing, attenuating, amplifying, or time-shifting a correlation that relates a stimulus to a response in the first computing environment.

9. The method of claim 1, wherein the a state of the trained model in the second computing environment is characterized by the set of model parameters, which has been modified, at the conclusion of adapting the trained model.

10. A non-transitory computer readable medium having stored thereon a sequence of instructions which, when stored in memory and executed by a processor, causes the processor to perform a set of acts, the set of acts comprising:
training a model into a trained model, wherein the model comprises a set of model parameters to capture resource consumption of computing and storage resources of a workload in a first computing environment, and the first computing environment is characterized by a first configuration;
detecting a difference between the first computing environment and a second computing environment characterized by a second configuration, wherein
the first configuration comprises at least a portion of the second configuration so that the first computing environment in which the model is trained comprises a computing node that is also in the second computing environment into which the trained model is to be deployed; and
deploying the trained model to the second computing environment, at least by adapting the trained model to the second computing environment, wherein adapting the trained model comprises modifying the set of model parameters based at least in part on the difference prior to conclusion of adapting the trained model to the second computing environment.

11. The non-transitory computer readable medium of claim 10, wherein the difference comprises a configuration difference between a target system configuration and a training system configuration.

12. The non-transitory computer readable medium of claim 10, wherein training the model comprises:
determining a storage IO performance characteristic at least by executing the training workload schedule in the first computing environment, wherein the trained model is adapted to the second computing environment based further at least in part upon the storage IO performance characteristic.

13. The non-transitory computer readable medium of claim 10, wherein the first computing environment corresponds to a training workload schedule, the second computing environment corresponds to a target workload schedule, and the training workload schedule comprises at least a portion of a target workload schedule.

14. The non-transitory computer readable medium of claim 10, wherein the first computing environment corresponds to a training workload schedule, the second computing environment corresponds to a target workload schedule, and the difference comprises a workload schedule difference between a target workload schedule and the training workload schedule.

15. The non-transitory computer readable medium of claim 10, wherein modifying the set of model parameters is performed prior to commencing a learning phase during which a relationship between an input and an output of the trained model is determined for the second computing environment.

16. The non-transitory computer readable medium of claim 10, wherein the set of model parameters characterizes a correlation between a stimulus and a response in the first computing environment.

17. A system, comprising:
a storage medium having stored thereon a sequence of instructions; and
a processor that executes the instructions to cause the processor to perform a set of acts, the set of acts comprising,
training a model into a trained model, wherein the model comprises a set of model parameters to capture resource consumption of computing and storage resources of a workload in a first computing environment, and the first computing environment is characterized by a first configuration;
detecting a difference between the first computing environment and a second computing environment characterized by a second configuration, wherein
the first configuration comprises at least a portion of the second configuration so that the first computing environment in which the model is trained comprises a computing node that is also in the second computing environment into which the trained model is to be deployed; and
deploying the trained model to the second computing environment, wherein at least by adapting the trained model to the second computing environment, wherein adapting the model comprises modifying the set of trained model parameters based at least in part on the difference prior to conclusion of adapting the trained model to the second computing environment.

18. The system of claim 17, wherein the difference comprises a configuration difference between a target system configuration and a training system configuration.

19. The system of claim 17, wherein training the model comprises:
determining a storage IO performance characteristic at least by executing a training workload schedule in the first computing environment, wherein the trained model is adapted to the second computing environment based at least in part upon the storage IO performance characteristic.

20. The non-transitory computer readable medium of claim 17, wherein modifying the set of model parameters is performed prior to commencing a learning phase during which a relationship between an input and an output of the trained model is determined for the second computing environment.

\* \* \* \* \*